(12) United States Patent
Zhang et al.

(10) Patent No.: US 12,551,125 B2
(45) Date of Patent: Feb. 17, 2026

(54) HANDHELD NON-INVASIVE COMPARTMENT SYNDROME DETECTOR

(71) Applicants: University Of Maryland, Baltimore, Baltimore, MD (US); University of Maryland, College Park, College Park, MD (US)

(72) Inventors: Li-Qun Zhang, Elkridge, MD (US); Andrew N. Pollak, Baltimore, MD (US); Robert O'Toole, Baltimore, MD (US); Giovanni Oppizzi, Hyattsville, MD (US)

(73) Assignees: University Of Maryland, Baltimore, Baltimore, MD (US); University of Maryland, College Park, College Park, MD (US)

( * ) Notice: Subject to any disclaimer, the term of this patent is extended or adjusted under 35 U.S.C. 154(b) by 428 days.

(21) Appl. No.: 18/173,703

(22) Filed: Feb. 23, 2023

(65) Prior Publication Data

US 2023/0263418 A1 Aug. 24, 2023

Related U.S. Application Data

(60) Provisional application No. 63/421,334, filed on Nov. 1, 2022, provisional application No. 63/312,972, filed on Feb. 23, 2022.

(51) Int. Cl.
*A61B 5/03* (2006.01)
*A61B 5/00* (2006.01)
(Continued)

(52) U.S. Cl.
CPC .............. *A61B 5/03* (2013.01); *A61B 5/0053* (2013.01); *A61B 5/14552* (2013.01);
(Continued)

(58) Field of Classification Search
CPC ..... A61B 5/03; A61B 5/0053; A61B 5/14552; A61B 5/7282; A61B 8/4416; A61B 8/485;
(Continued)

(56) References Cited

U.S. PATENT DOCUMENTS

2010/0030041 A1 2/2010 Bruinsma et al.
2017/0027499 A1* 2/2017 Shuler .................. A61B 5/4519
(Continued)

OTHER PUBLICATIONS

European Search Report and Search Opinion received for EP Application No. 23186734.2, mailed on Feb. 8, 2024, 18 pages.
Novak, M., et al., "Extremity compartment syndrome: A review with a focus on non-invasive methods of diagnosis", Front. Bioeng. Biotechnol., vol. 10, Jul. 18, 2022, 14 pages.
(Continued)

*Primary Examiner* — Abid A Mustansir
(74) *Attorney, Agent, or Firm* — Wolter Van Dyke Davis, PLLC; Eugene Molinelli; Michael W. Taylor

(57) ABSTRACT

Techniques for non-invasive detection of compartment syndrome (CS) in a subject, includes an apparatus having a structural body configured to be held in a human hand. The structural body includes a subject contact element that is not in contact with the human hand and is configured to contact but not penetrate a skin layer of a subject. The apparatus also includes an optical sensor configured to detect oxygen saturation at a plurality of depths of a subject in contact with the subject contact element. The optical sensor includes at least one light emitting diode (LED) and multiple photo detectors at corresponding different distances from the LED.

18 Claims, 20 Drawing Sheets

(51) Int. Cl.
*A61B 5/1455* (2006.01)
*A61B 8/00* (2006.01)

(52) U.S. Cl.
CPC .......... *A61B 5/7282* (2013.01); *A61B 8/4416* (2013.01); *A61B 8/485* (2013.01); *A61B 8/5223* (2013.01); *A61B 2560/0425* (2013.01); *A61B 2562/0247* (2013.01); *A61B 2562/028* (2013.01)

(58) Field of Classification Search
CPC .......... A61B 8/5223; A61B 2560/0425; A61B 2562/0247; A61B 2562/028; A61B 5/4519; A61B 8/0858; A61B 8/4427; A61B 5/0075; A61B 5/14551
See application file for complete search history.

(56) References Cited

U.S. PATENT DOCUMENTS

2017/0303834 A1* 10/2017 Bechtel ................ A61B 5/6887
2020/0315583 A1* 10/2020 Baumann ............. A61B 8/4281

OTHER PUBLICATIONS

Steinberg, B. D., et al., "Evaluation of limb compartments with increased interstitial pressure. An improved noninvasive method for determining quantitative hardness", Journal of Biomechanics, vol. 38, Issue 8, Aug. 2005, pp. 1629-1635.
Abay, T. Y., et al., "Reflectance Photoplethysmography as Noninvasive Monitoring of Tissue Blood Perfusion", IEEE Transactions on Biomedical Engineering, vol. 62, No. 9, 2015, pp. 2187-2195.
Lee, S. S. M., et al., "Use of shear wave ultrasound elastography to quantify muscle properties in cerebral palsy", Clinical Biomechanics, vol. 31, 2016, pp. 20-28.

* cited by examiner

HANDHELD NON-INVASIVE COMPARTMENT SYNDROME DETECTOR

CROSS-REFERENCE TO RELATED APPLICATIONS

This application claims benefit of Provisional Appln. 63/312,972, filed Feb. 23, 2022, and claims benefit of Provisional Appln. 63/421,334, filed Nov. 1, 2022, the entire contents of each of which are hereby incorporated by reference as if fully set forth herein, under 35 U.S.C. § 119(e).

BACKGROUND

Compartment syndrome (CS) is a painful musculoskeletal condition that increases pressure on the capillaries, nerves, and muscles in a muscle compartment, which reduces or disrupts blood flow to muscle and nerve cells and causes tissue damage.

Compartment syndrome can be either acute or chronic. Chronic compartment syndrome, also known as exertional compartment syndrome, is usually not a medical emergency. It is most often caused by physical exercise or vigorous activity, and it is reversible with rest. However, acute compartment syndrome is a medical emergency, especially for soldiers in intensive military training or in battlefield. In acute compartment syndrome, unless the pressure is relieved quickly, permanent disability and tissue death may result within a few hours.

Acute compartment syndrome usually develops after a severe injury such as bone fracture, badly bruised muscle, or crush injuries, or as a result of constricting casts and tight bandages, etc. Such traumatic conditions cause vascular injuries; and, bleeding after vascular injuries is the most common cause for CS, which leads to oxygen deprivation and consequently edema due to increases in capillary permeability and intracellular osmolarity/water retention. The edema physically impairs local blood flow, resulting in hypoxia and acidosis, starting a vicious circle of hypoxia and acidosis again increasing capillary permeability and fluid retention in the tissue. Furthermore, the nonelastic fascia limits volume expansion of the swollen muscle cells/tissue and therefore increases the intra-compartmental pressure (ICP). This condition can occur in many areas of the body.

Acute compartment syndrome (ACS) remains a challenging problem for orthopedic surgeons because its diagnosis is not always straightforward, and it has a high risk of associated limb morbidity if left undiagnosed or untreated.

Since ACS occurs due to an increase in ICP sufficient to restrict local blood flow, it is important to measure the ICP accurately and timely. Typically, a needle or catheter is inserted into the muscle to a depth of 2 to 4 cm to directly measure ICP. By this method, normal interstitial fluid pressure within relaxed compartments is established between 0 millimeters of Mercury (mmHg) to 8 mmHg.

For CS diagnosis, an absolute ICP threshold value of ≥30 mmHg was used. Clinicians began to use delta pressure to determine compartment syndrome by subtracting the compartment pressure from the diastolic blood pressure. Based on this method, compartment syndrome is diagnosed when the delta pressure is decreased to fall in a range from 10 mmHG to 30 mmHg.

SUMMARY

Although the needle or catheter insertion method allows an accurate measurement of ICP, it is invasive and requires the presence of highly trained specialists, which decreases the feasibility of pre-hospital monitoring. Therefore, there is a great unmet need for a convenient and non-invasive device suitable for field conditions and emergency rooms (ERs).

In a first set of embodiments, an apparatus for non-invasive detection of compartment syndrome (CS) in a subject includes a structural body configured to be held in a human hand. The structural body includes a subject contact element that is not in contact with the human hand and is configured to contact but not penetrate a skin layer of a subject. The apparatus also includes an optical sensor configured to detect oxygen saturation at multiple depths of a subject in contact with the subject contact element. The optical sensor includes a light emitting diode (LED) and multiple photo detectors at corresponding different distances from the LED.

In some embodiments of the first set, the LED is configured to output multiple different optical frequencies. In some of these embodiments, the LED is configured to output multiple different infrared optical frequencies. In some embodiments of the first set, the LED is configured to output a plurality of different optical intensities.

In some embodiments of the first set, the apparatus includes a pressure sensor configured to determine the pressure on the subject contact element. In some of these embodiments, the pressure sensor includes a fluid chamber and a micro-electrical-mechanical system (MEMS) pressure sensor in fluid contact with fluid in the chamber. In some of these embodiments, the apparatus includes a displacement sensor configured to determine displacement into a fluid filled flexible chamber by a probing rod or by a plunger or by both In some embodiments of the first set, the apparatus includes an ultrasound probe configured to determine stiffness of a compartment of the subject.

In some embodiments of the first set, the apparatus includes a means for determining whether the subject in contact with the subject contact element has compartment syndrome based at least in part on data from the optical sensor. In some of these embodiments, the means for determining whether the subject in contact with the subject contact element has compartment syndrome includes an on board processor configured to make the determination or a communication link with a remote processor configured to make the determination.

In some embodiments of the first set, the apparatus includes a means for displaying that the subject has compartment syndrome. In some of these embodiments, the means for displaying that the subject has compartment syndrome includes an on board display device or a communication link with a remote device comprising a display device.

In other sets of embodiments, a system or a method is configured to provide or operate one or more of the components of the apparatus.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

A method and apparatus are described for non-invasive detection of compartment syndrome (CS) in a subject. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of multiple sensors in a hand-held device operating on human leg muscles to detect Compartment Syndrome (CS). However, the invention is not limited to this context. In other embodiments muscle compartments in other limbs of human or animal are operated on to determine CS or similar syndromes.

1. Overview

Figure 1:
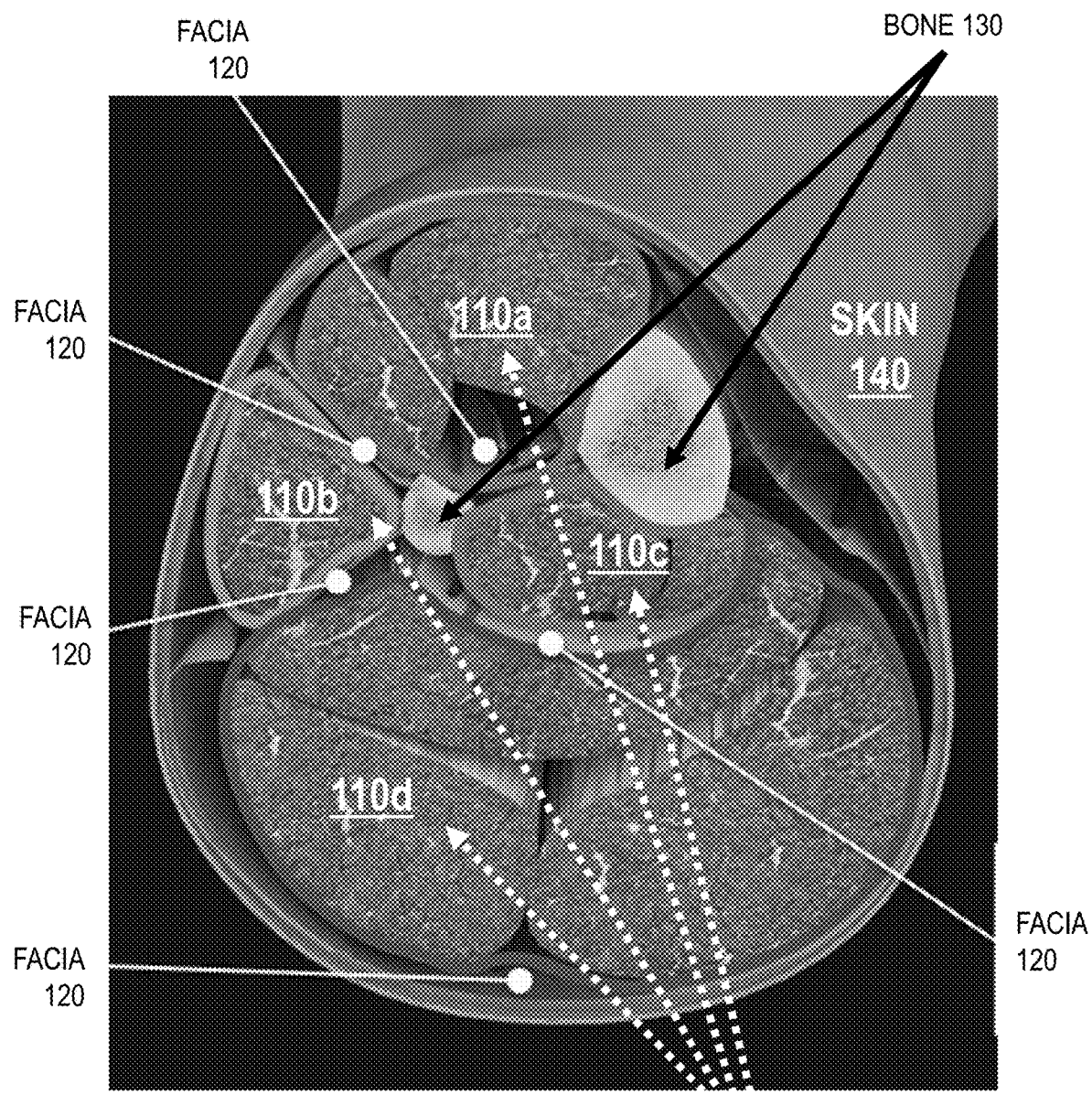
FIG. 1 is a diagram that illustrates example muscle compartments in a human leg for which a compartment syndrome can be detected, according to an embodiment.

FIG. 1 is a diagram that illustrates example muscle compartments in a human leg for which a compartment syndrome can be detected, according to an embodiment. The diagram shows a cross section of a lower leg of a human and includes cross sections of the skin 140 with its subcutaneous fat layers, and the tibia and fibula bones 130 of the lower leg. In addition, four muscle compartments 110a, 110b, 110c, 110d, collectively referenced as compartments 110, are depicted. These compartments 110 are separated from each other by non-porous and relatively inelastic (compared to muscle tissue) facia 120 adjacent to white dots in the diagram.

To avoid the complexities and needle intrusions of previous techniques to detect CS, several new methods and devices are deployed in order to design a less invasive diagnosis tool and to determine the presence of an ACS early before irreversible muscle and nerve damage has occurred. These new methods and devices, which have not been approved for clinical use at this time, include near-infrared spectrometry (NIRS), measurement of intramuscular glucose and oxygen levels, ultrasound, and monitoring of changes in muscle microvascular blood flow, perfusion pressure, pH and oxygenation.

For compact, lightweight pressure measurement of CS, MEMS (Micro Electro-Mechanical System) pressure transducers can be employed. MEMS is a chip-based technology. When a component is deflected, a difference in electrical potential is created. The created difference is then measured as a change in capacitance. By such means, MEMS converts pressure signals into electrical signals via small strain gauges, called piezo resistors, implanted in a thin silicon membrane. A trace of pressure plotted against increasing force applied to a device that touches but does not penetrate the skin can be used to infer compartment pressure by inflections in the pressure response to increasing externally applied load. The rate of change of such a trace can be used to infer stiffness of the system including the device and the subject's skin and the subject's muscle compartments.

In some embodiments, stiffness is measured independently, along with, or instead, of pressure. There have been a few studies on the use of ultrasound to measure elasticity for the diagnosis of CS. For the application of ultrasound elastography, usually the stress (force per unit area directed at a tissue) is manually applied to the target soft tissues such as abdominal organs or muscles by compressing them while measuring ultrasound reflections with a hand-held B-mode (brightness mode) ultrasound transducer. The resulting axial tissue displacement or compression (i.e., the strain) is determined by changes in different sets of echoes before and after the application of the stress, which is displayed by black/white or colors. Thus, ultrasound elastography can be a method to obtain information on relative tissue stiffness compared with the surrounding tissue within the image section at one or more applied compression forces.

In some embodiments, stiffness is determined through a combination of pressure and displacement measurements, as described in more detail below with reference to FIG. 2C.

In addition, since blood flow restriction due to the increased pressure in the muscle compartment is an important symptom of CS, measurement of intramuscular oxygen can improve the early diagnosis of acute compartment syndrome. However, very few existing oxygen sensors have been approved for such a purpose, and there is a need for noninvasive accurate peripheral oxygen saturation ($SpO_2$) measurement at the injury site of large body parts.

The most common approach for the measurement of $SpO_2$ is pulse oximetry, which is convenient, safe, inexpensive, and noninvasive for clinical use, and its readings are within 2-4% accuracy of the more accurate (and invasive) readings of arterial oxygen saturation ($SaO_2$) from arterial blood gas analysis. There are two main types of pulse oximetry: transmittance pulse oximetry and reflectance pulse oximetry.

Transmittance pulse oximetry uses two small light-emitting diodes (LEDs) facing photodiodes (light detectors), which transmit two wavelengths of light through a thin translucent body part, usually a fingertip or an earlobe, to the photodiodes on the opposite side. One LED is red with a wavelength of 660 nm, and the other is infrared with a wavelength of 940 nm. As light passes through the body part, the light is absorbed by the body part, which is affected by the amount of oxygen in the blood correlating with the oxygenation of hemoglobin. Absorption of light at these wavelengths differs significantly between blood loaded with oxygenated hemoglobin and blood loaded with deoxygenated hemoglobin. Oxygenated hemoglobin absorbs more infrared light and allows more red light to pass through. Deoxygenated hemoglobin absorbs more red light and allows more infrared light to pass through.

The photodiode on the opposite side detects light that is not absorbed, and a microprocessor calculates the oxygen saturation in the blood according to the Beer-Lambert law ($A=\varepsilon bC$; A=absorbance, $\varepsilon$=molar absorptivity, b=length of light path, C=concentration). A blood-oxygen monitor displays the percentage of blood that is loaded with oxygen. More specifically, it measures what percentage of hemoglobin is oxygenated using Equation 1.

$$SpO_2 = HbO_2/HbO_2 + Hb \qquad (1)$$

where $HbO_2$ is oxygenated hemoglobin (oxyhemoglobin) and Hb is deoxygenated hemoglobin. However, a pulse oximeter does not calculate $SpO_2$ of venous blood (and skin, bone, muscle, fat, etc.) but only arterial $SpO_2$ because it determines changes in absorbance of the light over time.

After the amount of light that is transmitted (in other words, that is not absorbed) is measured, separate normalized signals are produced for each wavelength. These signals fluctuate in time because the amount of arterial blood fluctuates with each heartbeat. By subtracting the minimum transmitted light from the transmitted light in each wavelength, the effects of other non-pulsatile tissues including veins are corrected for generating a continuous signal for pulsatile arterial blood. The ratio of the red light measurement to the infrared light measurement is then calculated by the processor (which represents the ratio of deoxygenated hemoglobin to oxygenated hemoglobin), and this ratio is then converted to $SpO_2$ by the processor based on the Beer-Lambert law. The signal separation is also used for other purposes: a plethysmograph waveform ("pleth wave") representing the pulsatile signal is usually displayed for a visual indication of the pulses as well as signal quality, and a numeric ratio between the pulsatile and baseline absorbance ("perfusion index") can be used to evaluate perfusion.

Reflectance pulse oximetry is a less common alternative to transmissive pulse oximetry. This method does not require a thin translucent body part and is therefore applicable to large body parts such as lower limb, forehead, and chest. In this method, the LEDs and PDs of a reflectance pulse oximeter are placed on the same side of the skin surface, and the PDs measure the light reflected off the tissue rather than the light through the tissue. In this way, absorption (not reflected) is measured to calculate oxygen saturation.

Functional near-infrared spectroscopy (fNIRS) is another way to use infrared light to measure tissue blood flow. fNIRS is a non-invasive brain imaging method, which measures changes in chromophore concentration in blood such as oxy- and deoxyhemoglobin, which occur in response to neural activity. The technique is based upon the changes in absorption of light emitted by sources onto the surface of the target tissues and measured by photodetectors. The technique is based on the optical window in which (a) skin, tissue, and bone are mostly transparent to NIR light (700 nm-1 mm spectral interval) and (b) oxygenated hemoglobin ($HbO_2$) and deoxygenated-hemoglobin (Hb) are strong absorbers of light. The absorption of infrared light is different for these two chromophores; deoxyhemoglobin absorbs more light below 790 nm and oxyhemoglobin more light above 790 nm. In this $O_2$ measurement method, the light emitter and detector are usually placed with 3 cm separation on the same side on the target tissue, and back-scattered (reflected) light following elliptical pathways are recorded for the measurement.

The $SpO_2$ measurement alone is the simplest configuration. To improve the detection, pressure and/or elasticity are added in various embodiments. The three approaches ($SpO_2$, pressure, elasticity) combined makes the CS detection more accurate/reliable. Triple detection makes it an accurate detection, with much more corroborations and confidence.

1.1 System Structures

Figure 2A:
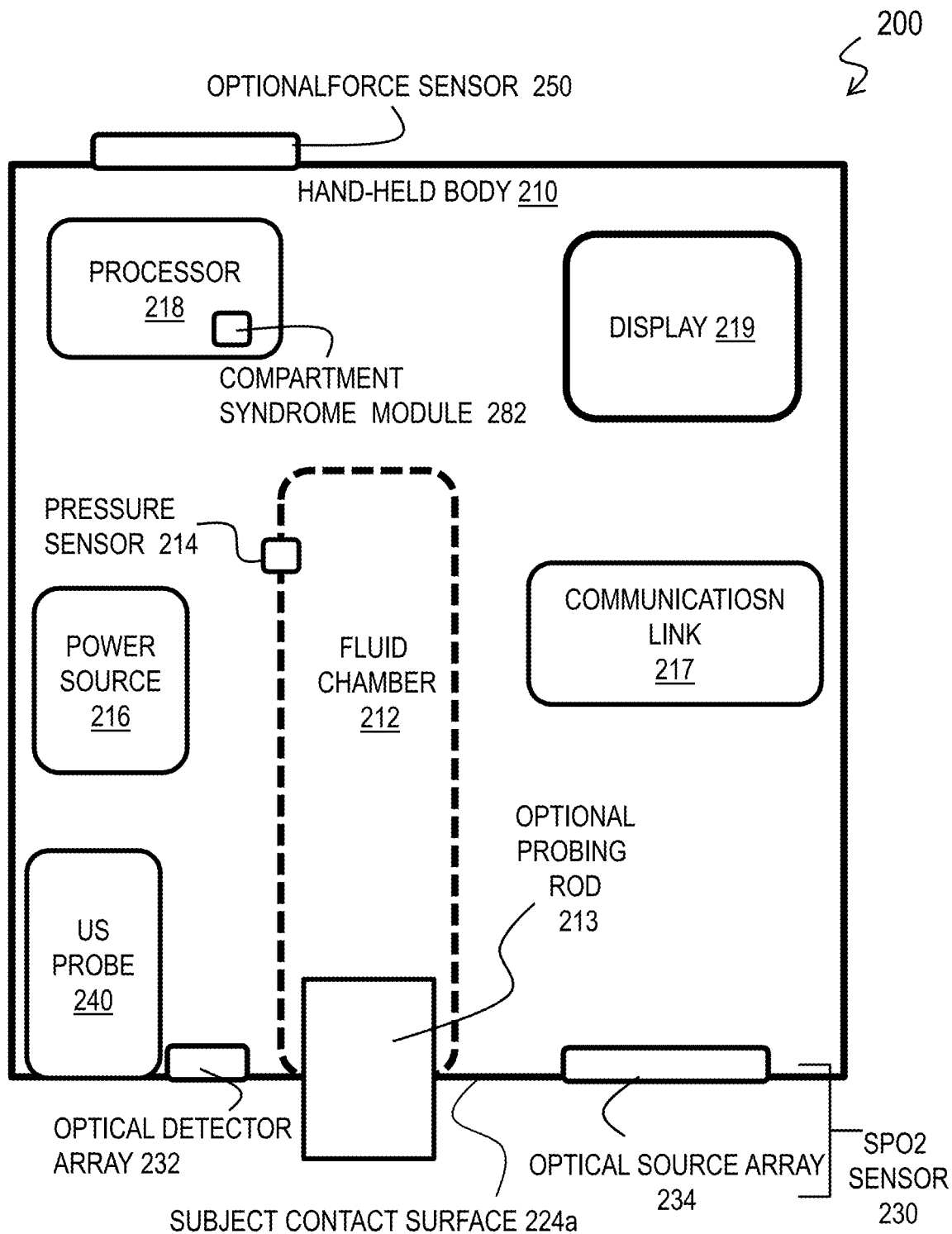
FIG. 2A is a block diagram that illustrates example hand-held apparatus configured to non-invasively detect compartment syndrome, according to an embodiment.

FIG. 2A is a block diagram that illustrates example hand-held apparatus 200 configured to non-invasively detect compartment syndrome, according to an embodiment. The apparatus 200 is configured to be lightweight, compact and hand-held, and is depicted as a hand-held structural body 210. By hand-held is meant that the structural body 210 can be easily lifted, moved, deployed in a single hand of a mature human. The structural body 210 also provides a scaffold to which the other components of device 200 can be fixedly or removably attached or integrated. In various embodiments, the hand-held body 210 is shaped for comfort of a human user/operator or for orienting a hand of the user for proper operation of device 200.

An element (either attached to, or composing an integral portion of, the hand-held body 210) is configured to be placed in contact with the skin of a subject for whom a detection of CS, if present, is to be made. This element is called a subject contact element, such as subject contact surface 224a of hand-held body 210 depicted in FIG. 2A. The subject contact element is configured to be not blocked by the hand of the human deploying the device 200, but rather to be placed against the skin (of the limb or other part) of the subject, (human or animal) for whom the occurrence of CS is to be determined.

The device 200 also includes an optical oxygen saturation ($SpO_2$) sensor 230 because of oxygen saturation sensitivity to the occurrence of CS in a muscle compartment, as described above. In general the optical sensor is disposed along or adjacent to the subject contact element so it is also in contact with the skin of the subject.

The optical $SpO_2$ sensor 230 includes one or more optical sources in an optical source array 234. Because of their low energy demands, small size, light weight, and wide range of available optical frequencies and intensities, light emitting diodes (LEDs) make excellent optical sources for optical source array 234. In some embodiments, the optical source array 234 includes a single LED. In some embodiments, teach LED can be driven to emit at more than one optical frequency or emit at more than one optical intensity, or some combination. In various embodiments, the LEDs have various wavelengths in the infrared range, below and above the isosbestic point, such as 770 nanometers (nm, $1\ nm=10^{-9}$ meters) and 940 nm. In some embodiments, the deep reaching intensities correspond to a driving current of about 100 milliamperes (mA, $1\ mA=10\text{-}3$ Amperes). In various embodiments, the LEDs are drive a currents between about 50 and 200 mA, The optical $SpO_2$ sensor 230 also includes two or more optical detectors in an optical detector array 232. Because of their low energy demands, small size, light weight, and wide range of available optical frequencies and dynamic range, photodiodes (PDs) make excellent optical detectors for optical detector array 232. The distances between the two or more optical detectors in the array 232 and the one or more LEDs in the source array 234 are configured to detect paths through different compartments at different depths from the skin of the subject. For example, in various embodiments, the distance between an LED and an array of photodiodes is from about 1 centimeter (cm, $1\ cm=10^{-2}$ meters) to about 8 cm.

In some embodiments, the device 200 includes a pressure assembly, such as the fluid chamber 212, pressure sensor 214 and optional probing rod 213. Because of their low energy demands, small size, light weight, and wide range of available dynamic range, MEMS pressure sensors make an excellent choice for pressure sensor 214. In some embodiments, the MEMS pressure sensor is disposed on the subject contact element 224a to detect the force with which the device 200 is pressed against the skin of the subject. In some embodiments, the force is transferred from the subject contact element 224a to the pressure sensor 214 through a fluid in a fluid chamber 212. In some embodiments, a probing rod 213 is included, and the rod will be subsumed into the fluid chamber when the pressure reaches a threshold, such as 30 mmHg, where CS is of concern. At that pressure point, the $SpO_2$ sensor comes into contact with the skin and the $SpO_2$ measurement can be made.

In some embodiments, stiffness of the compartment is of interest. Stiffness, e.g., the Young's modulus, E, is the ratio of pressure over strain. Strain is a change in size of a material. In such embodiments, a probing rod 213 is included, and the displacement of the probing rod into the fluid resulting in a change of volume of the fluid constitutes a measure of strain that can be used with the measured pressure to determine stiffness. If the probing rod is in pressure contact with the compartment, some of the strain is taken up by the muscle compartment, and thus the strain in the fluid chamber 212 will be less. The stiffness of the compartment can then be determined by considering the stiffness of the fluid chamber (fluid and walls) to be a spring with spring constant k1 (known through calibration) based on its stiffness in series with the muscle compartment with unknown spring constant k2 based on its stiffness. This situation is shown in FIG. 2C and discussed in more detail below.

As the compressive load is applied to the MEMS sensor compartment and muscle compartment in series, the soft skin and subcutaneous soft tissue are compressed first. Then the sensor compartment and muscle compartment can be considered as two springs in series. The load-response behavior of the combined sensor and muscle compartments compared to that of the sensor compartment alone can also be used to detect if the muscle compartment has excessive pressure.

Specifically, the initial sensor compartment pressure can be set at 30 mmHg. It can be assumed that pressure is proportional to the compressive stiffness. There are relevant data in the literature. For practical applications, the pre-calibrated sensor compartment with measured 30 mmHg pressure (or might be slightly lower) and corresponding compressive stiffness to derive whether the target muscle compartment is stiffer (or higher in pressure). If the sensor and muscle compartments are at the same 30 mmHg (e.g., have the same stiffness), the overall sensor-muscle compartments series stiffness would be half of that when the sensor compartment alone is loaded. In other words, if the stiffness of the sensor-muscle compartments is higher than half of the sensor compartment alone, muscle compartment has higher stiffness (and presumably pressure) than the sensor compartment, as described in more detail with reference to FIG. 2C.

In some embodiments, the total loading force that is advantageous to know, e.g., in order to determine the distribution of pressure between fluid chamber 212 and muscle compartment 110 is measured directly with an optional force sensor 250.

In some embodiments, stiffness in one or more muscle compartments is measured directly using ultrasound probe 240, also disposed along or adjacent to the subject contact element, such as surface 224a. This can be combined with the stiffness deduced from the pressure measurement and the total loading force.

In various embodiments the device includes a power source 216, such as a battery or electrical cord receptacle or USB port for a separate device, such as an electric vehicle, to power the onboard sensors and other electronic components.

In some embodiments, the device 200 includes a display to display the $SpO_2$ results, or pressure results, or stiffness results, or a determination or likelihood of CS, or some combination. In some embodiments, the device 200 includes a processor 218, such as chip set depicted in FIG. 9, configured with a CS module 282 that determines the compartment pressure, or compartment $SpO_2$, or compartment stiffness, or likelihood of compartment syndrome, or some combination. In some embodiments, processor 218 and screen are hosted in whole or in part on a remote device, such as computer system depicted in FIG. 8, or a mobile terminal like a smartphone depicted in FIG. 10. Such embodiments augment device 200 with a communication link 217 to the remote device.

In various embodiments, some or all of the fluid chamber 212, pressure sensor 214, SpO2 sensor 230, US probe 240, power source 218, and communication link 217 are enclosed by the hand-held body 210, with only the active area of the fluid chamber 212 or pressure sensor 214 itself, of the SpO2 sensor 230, and of the US probe exposed to the subject contact element, such as surface 224a. In some embodiments, one or more of the components is mounted externally to the hand-held body 210. When present, the probing rod 213 extends outside the hand-held body 210. For example, in some embodiments, the SpO2 sensor or the US sensor, or both, is mounted outside the hand-held body 210 adjacent to the subject contact element.

Figure 2B:
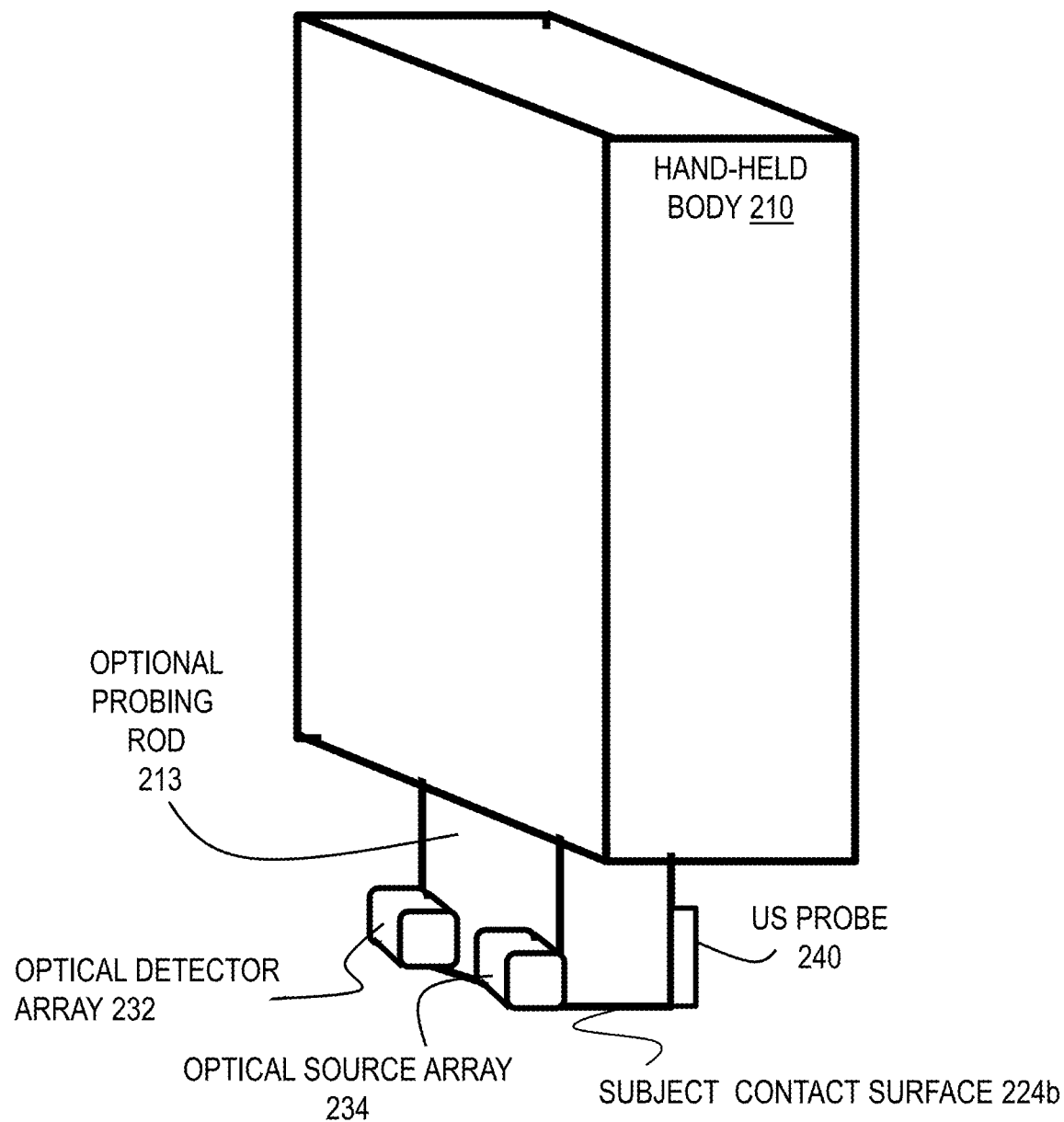
FIG. 2B is a block diagram that illustrates another example hand-held apparatus configured to non-invasively detect compartment syndrome, according to an embodiment.
Figure 2C:
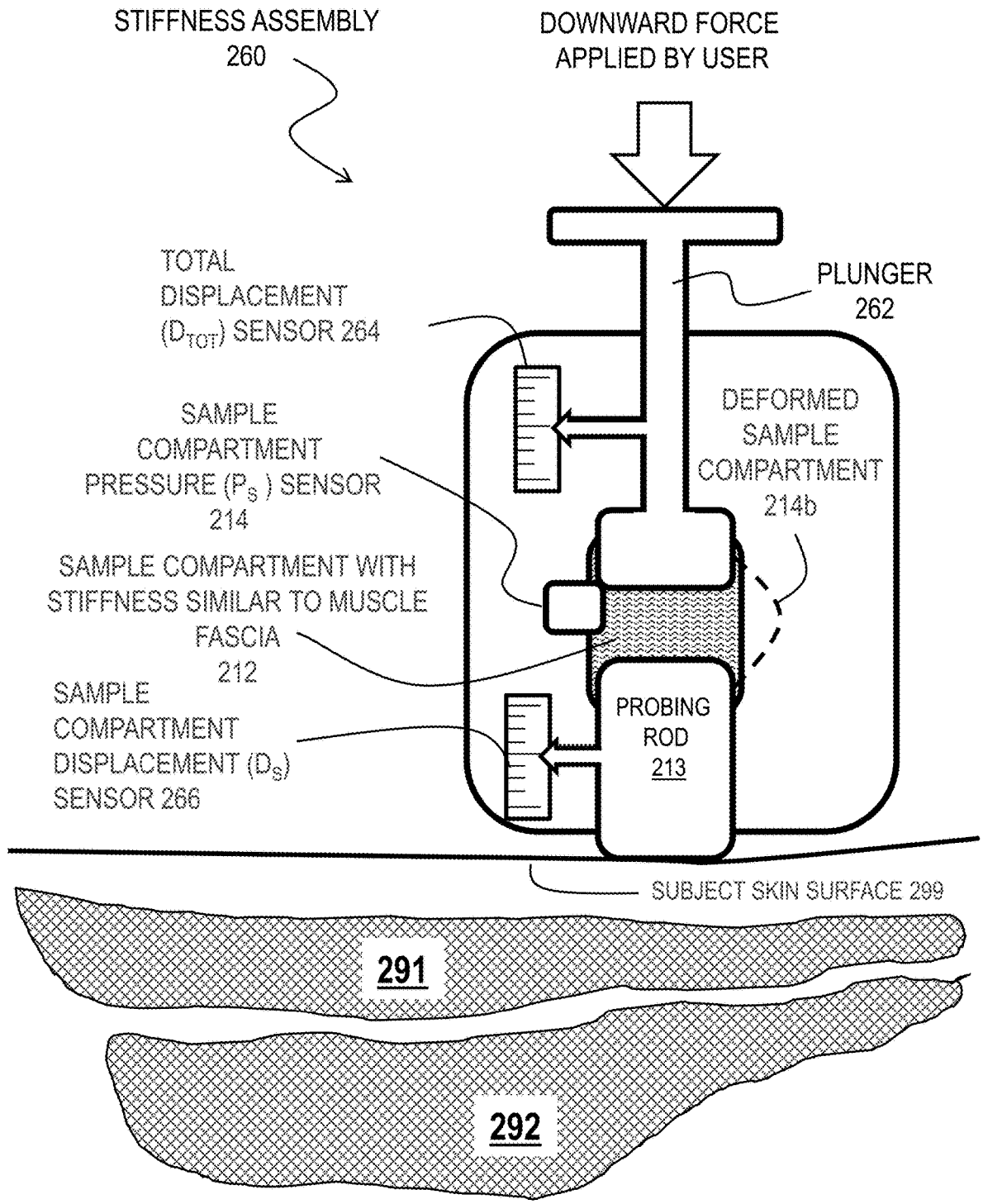
FIG. 2C is a block diagram that illustrates a stiffness assembly for an hand-held apparatus configured to non-invasively detect compartment syndrome, according to an embodiment.

FIG. 2B is a block diagram that illustrates another example hand-held apparatus configured to non-invasively detect compartment syndrome, according to an embodiment. In this embodiment, the probing rod 213 does not compress entirely within the fluid chamber at a pressure of interest, such as at 30 mmHg, and so the subject contact element is the surface 224b of the probing rod 213. In such embodiments, optical SpO2 sensor 230 components 232 and 234 are fixed to the probing rod 213 adjacent to the surface 224b so that the SpO2 sensor 230 is also in contact with the subject. Similarly, the US probe 240, if present, is also fixed to the probing rod 213 adjacent to the surface 224b so that the US probe is also in contact with the subject.

In some embodiments, the pressure sensor 214 is part of a stiffness assembly that also includes the fluid chamber 212 and the probing rod 213. FIG. 2C is a block diagram that illustrates a stiffness assembly 260 for an hand-held apparatus configured to non-invasively detect compartment syndrome, according to an embodiment. Although FIG. 2C depicts for context the subject skin surface 299 and two muscle compartments, superficial compartment 291 and deeper compartment 292, none is part of stiffness assembly 260.

Stiffness assembly 260 includes pressure senor 214, fluid chamber 212 and probing rod 213, as described above. In addition, the stiffness assembly includes a plunger 262, a sensor 264 for total displacement of the plunger $D_{TOT}$, and a sensor 266 for sample compartment displacement $D_S$. Any sensor that measured displacement of one body relative to another may be used, with displacements measured relative to hand-held body 210 in which stiffness assembly 260 is disposed. In various embodiments, the hand-held body 210 also includes, with the stiffness assembly 260, an SpO2 sensor 230 disposed in, along or adjacent to a subject contact element 224a or 224b.

Figure 2D:
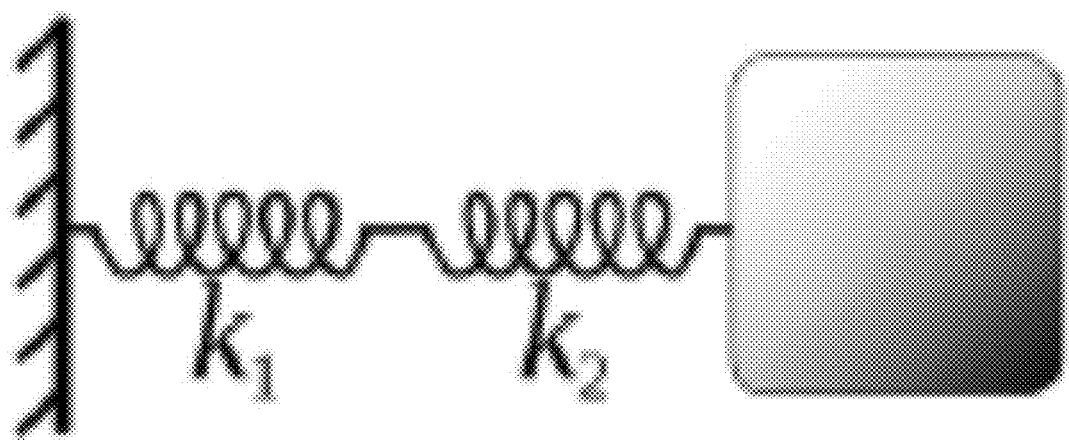
FIG. 2D is a block diagram showing two springs in series with different stiffnesses, used according to an embodiment.

In this embodiment, the stiffness $K_S$ of the fluid chamber i.e., its resistance to change in shape (e.g., shape outline 214b) due to applied pressure in the sample chamber $P_S$, is the inverse of the Young's modulus, E, and is given by the sum of the displacements measured at sensors 264 and 266 divided into the pressure $P_S$. That stiffness $K_S$ is fixed and is known through laboratory calibration, e.g., by setting the probing rod 213 against an surface that does not move at the pressures of interest (and has infinite stiffness). The stiffness of the compartment can then be determined by considering the stiffness of the fluid chamber (fluid and walls) to be a spring with spring constant k1 (known through calibration) based on its stiffness, in series, by virtue of probing rod 213, with the muscle compartment (291 or 292 or both) with unknown spring constant k2 based on stiffness of the muscle compartments. FIG. 2D is a block diagram showing two springs in series with different stiffnesses, used according to an embodiment.

The measured stiffness km of the stiffness assembly-muscle compartment combination is related to the two stiffnesses as given by Equation 2a.

$$1/km=1/k1+1/k2 \quad (2a)$$

Expressed in terms of pressure and displacement this becomes Equation 2b.

$$D_{TOT}/P_{TOT}=D_S/P_S+D_C/P_C \quad (2b)$$

Where $P_C$ and $D_C$ are the pressure and displacement in the compartment, respectively, neither one known a priori.

In some embodiments, the fluid chamber 212 is configured to have a stiffness similar to the stiffness of muscle compartment facia and it is assumed that the stiffness of the facia is providing the stiffness of the muscle compartment.

Under these assumptions, $K_C \approx K_S$ and Equation 3a can be employed.

$$D_S/P_S=D_C/P_C \quad (3a)$$

which can be re-written as Equation 3b.

$$P_C=P_S*D_C/D_S \quad (3b)$$

Then force is applied on plunger 262 until the measured displacement $D_S$ by the probing rod 213 is half the measured total displacement $D_{TOT}$. At that point, $D_S=D_C$; and according to Equation 3b, the pressure in the fluid chamber $P_S$ is equal to the compartment pressure $P_C$. Thus, the desired compartment pressure $P_C$ is obtained.

In order to stay in the elastic range of the fluid chamber 212 and its walls, it is advantageous to configure the fluid chamber near the threshold pressure for CS. Thus, in some embodiments, before applying force on plunger 262, the pressure in fluid compartment 212 is set at 30 mmHg.

Although processes, equipment, and data structures are depicted in FIGS. 2A and 2B as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts. For example, some or all of the functions performed by processor 218 and display 219 can be performed by a smartphone or tablet in BLUETOOTH™ communication with the device 200 through communication link 217.

1.1 System Methods

Figure 3:
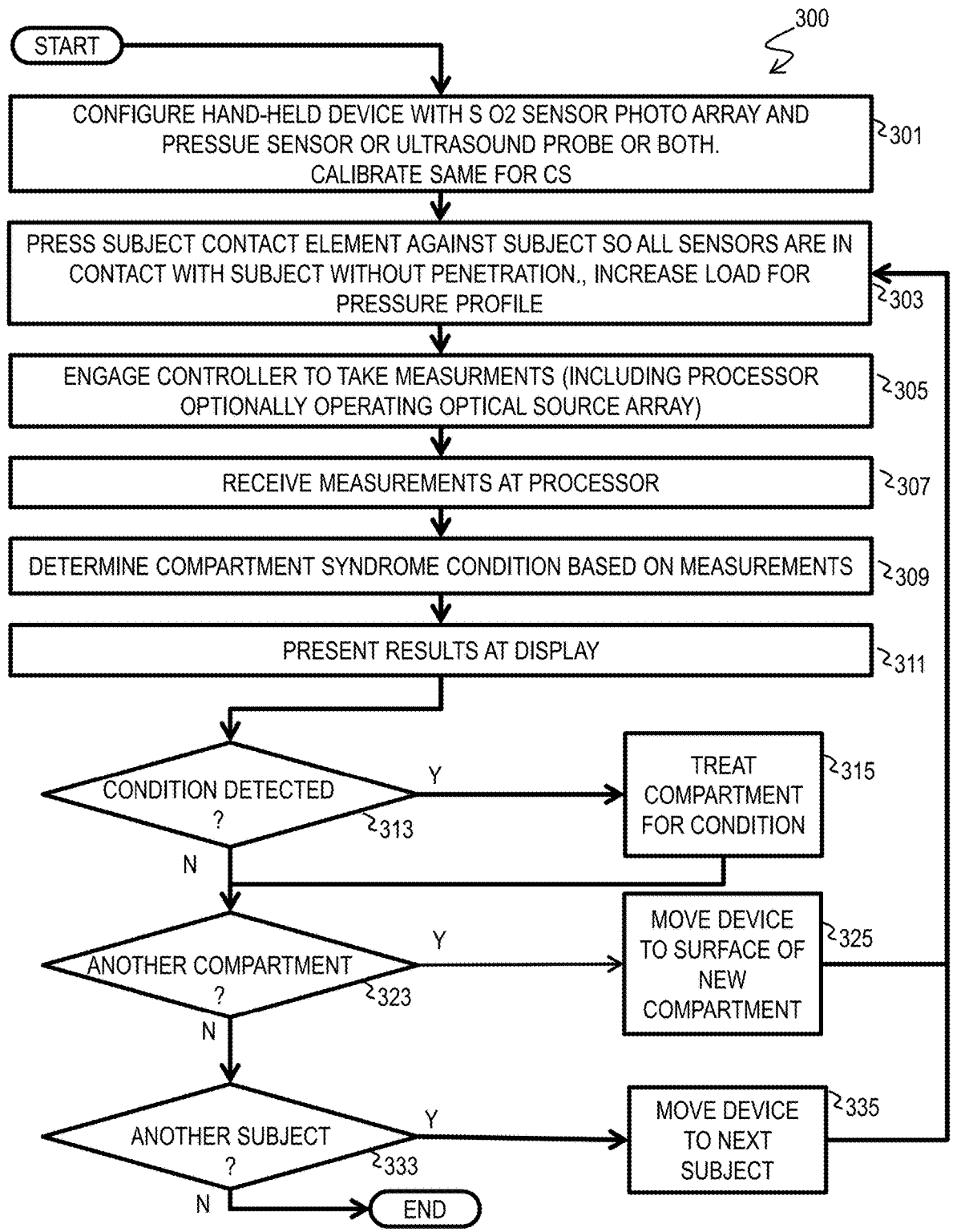
FIG. 3 is a flow diagram that illustrates an example method to make and use a hand-held apparatus configured to non-invasively detect compartment syndrome, according to an embodiment.

FIG. 3A is a flow diagram that illustrates an example method 300 to make and use a hand-held apparatus configured to non-invasively detect compartment syndrome, according to an embodiment. Although steps are depicted in FIG. 3, and in subsequent flowchart FIG. 5, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 301 a hand-held device 400 is configured with one or more of an SpO$_2$, sensor, a pressure sensor, and an US probe, each in, along or adjacent to a subject contact element. In some embodiments, the pressure sensor is included with at least one displacement sensor as part of a stiffness assembly. In some embodiments the SpO2 sensor is an optical sensor with an array of one or more LEDs and an array of two or more photodiodes. In some embodiments, the pressure sensor is a MEMS pressure sensor. In some embodiments, the pressure sensor is part of a pressure sensor assembly that includes a fluid chamber. In some embodiments, the pressure sensor is part of a pressure sensor assembly that includes a probing rod.

Step 301 includes calibrating the device by taking measurements from each sensor included, along with independent measurements of compartment properties to determine the combination of measurements that are best associated with compartment syndrome (CS). Any method may be used to do the calibration, and a few are descried below with respect to certain embodiments. The sensor or probe measurements can be combined in a statistical model or physics model or an artificial intelligence mechanism such as a neural network, and the parameters of the model or mechanism are fit so the sensor input produces an output that matches the CS determination using independent means, such as previous best practice. Alternatively, or in addition, each sensor can be calibrated individually to properly output the compartment property (SpO2, pressure, stiffness) that is the target of the sensor. Such calibration data is stored for later use by an operator or by CS module 282 on processor 218.

In step 303, the device is brought into contact with a subject so that measurements of the subject pertinent to detecting CS can be obtained. Step 303 includes pressing the subject contact element against the subject so all sensors are in contact with the subject without penetrating the skin of the subject. In embodiments in which the device includes a pressure sensor, a forcing load is increased over time to generate a profile of pressure with increasing load or until the measure deflection of the probing rod 213 is half the total displacement of the plunger 262.

In step 305, a controller module, such as compartment syndrome module 282, is invoked or otherwise engaged to take measurements including recording pressure measurements with time from pressure sensor 214, or recording US images from US probe 240 at various pressures from sensor 214 or force loads from sensor 250, or operating one or more optical sources in array 234 at one or more optical frequencies and one or more intensities, and recording optical measurements made at each of two or more optical detectors in array 232, or some combination. In some embodiments, the controller is a simple button or switch activated by a human operator. The activation causes the sensor or sensors to automatically take measurements for a preset time interval or until the operator releases the button or switch.

In step 307, measurements from any on-board sensors (e.g., SpO2 sensor 230, pressure sensor 214, US probe 240 or force load sensor 250, or some combination) are received at a processor, such as by CS module 282 on processor 218.

In step 309, the compartment syndrome condition is determined based on the measurements. For example, raw measurements from one or more on-board sensors are prepared for presentation on display 219, along with any predetermined threshold values, for manual determination by an operator. Alternatively, in some embodiments, the sensor measurements, or graphs thereof, or a CS yes /CS no indicator, or a percentage likelihood of CS, or some combination is determined by CS module 282 on processor 218 based on the measurements from the on-board sensors and the calibration data stored during step 301.

In step 311, results are presented on display, such as display 219. In some embodiments, the results are sensor measurements prepared for display with any predetermined threshold values. In some embodiments, the results are output by CS module 282 of processor 218, such as a CS yes /CS no indicator or a likelihood of CS, or some combination.

In step 313, it is determined whether the CS condition has been detected or is more likely than not based on the information presented on display 219. If not, control passes directly to step 323. If so, control passes first to step 315. In step 315 the subject is treated for CS for the measured compartment. Control then passes to step 323.

In step 323, it is determined whether there is another compartment to check. If not, control passes to step 333. If so, control passes instead to step 325. In step 325 the device 200 is moved to another area of the subject above another compartment of interest or concern. Control then passes back to step 303 and following to operate the device over the new compartment.

In step 333, it is determined whether there is another subject to check. If not, the process ends. If so, control passes instead to step 335. In step 335 the device 200 is moved to the next subject of concern. Control then passes back to step 303 and following to operate the device over a compartment of concern in the next subject.

By the method of 300 using a device of the type 200, a convenient and non-invasive device suitable for field conditions and emergency rooms is provided.

2. Example Embodiments

In this section several embodiments and calibrations therefor are described. The statements made in this section may apply only to some of the embodiments described in this section.

FIG. 4A through FIG. 4F are block diagrams that illustrate use and calibration of a pressure sensor in a hand-held apparatus configured to non-invasively detect compartment syndrome, according to an embodiment. The pressure sensor compartment has a fluid-filled bag with a MEMS pressure sensor attached to it. By pushing down the device onto the skin of the leg containing the muscle compartment, the compliant skin and subcutaneous soft tissues get compressed first. Considering both the fluid-filled bag of the pressure sensor compartment and the muscle compartment are enclosed in soft containers, the probing rod is pushed into both the pressure sensor compartment and the muscle compartment to create an indentation to the fluid-filled bag. At this time, the top part of the probing rod locating below the fluid-filled bag applies the same force and pressure felt by the bottom part of the probing rod and the muscle compartment to the fluid-filled bag of the pressure sensor compartment above, and the MEMS pressure sensor detects this pressure change in the fluid-filled bag.

Figure 4A:
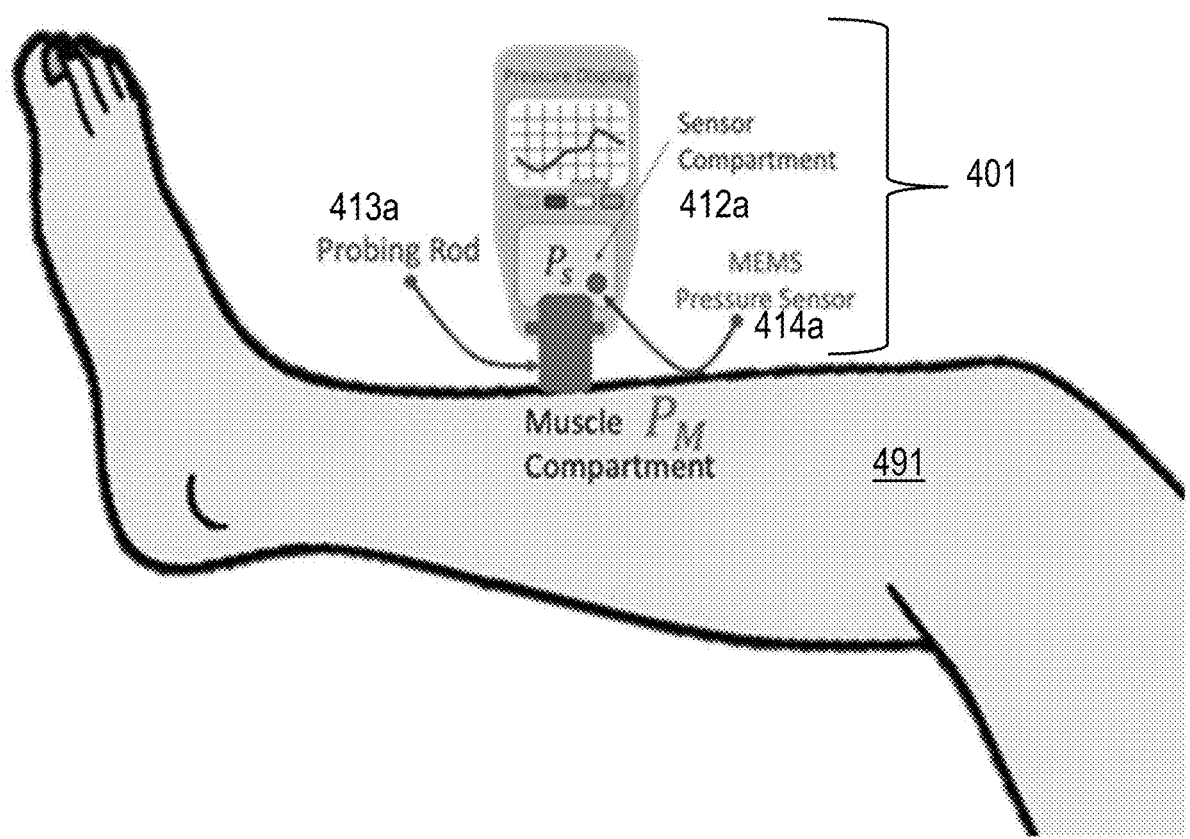
FIG. 4A through FIG. 4E are block diagrams that illustrate use and calibration of a pressure sensor in a hand-held apparatus configured to non-invasively detect compartment syndrome, according to an embodiment.
Figure 4B:
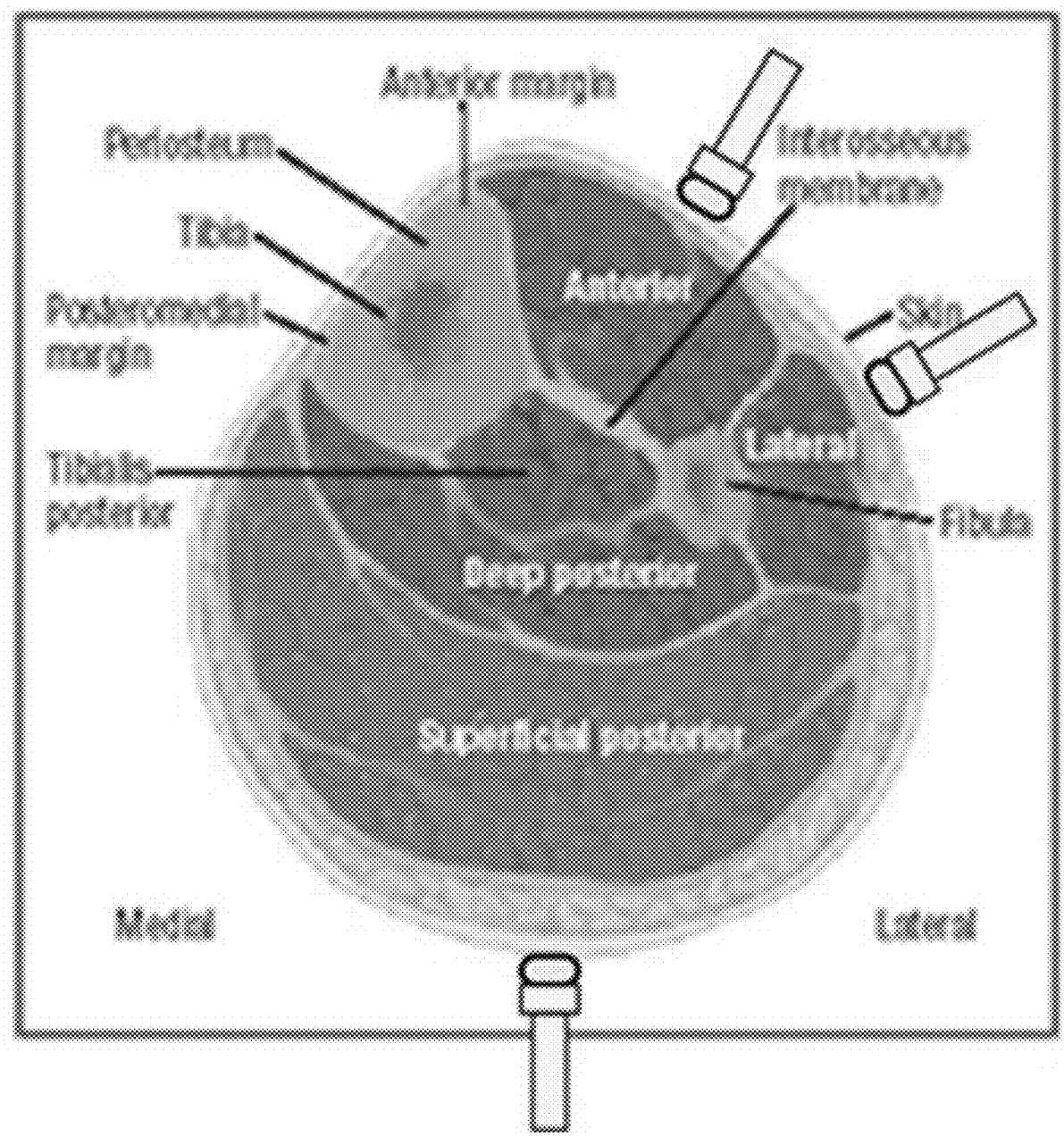

This approach can be performed on the sites of the leg indicated in FIG. 4B to survey multiple muscle compartments.

Once the indentation is fully established at both ends of the probing rod, which can be corroborated by the amount of pressing force or by observing the indentation onto the muscle compartment, the pressure of the pressure sensor compartment matches the pressure of the muscle compartment, as shown in a pilot calibration study.

Figure 4C:
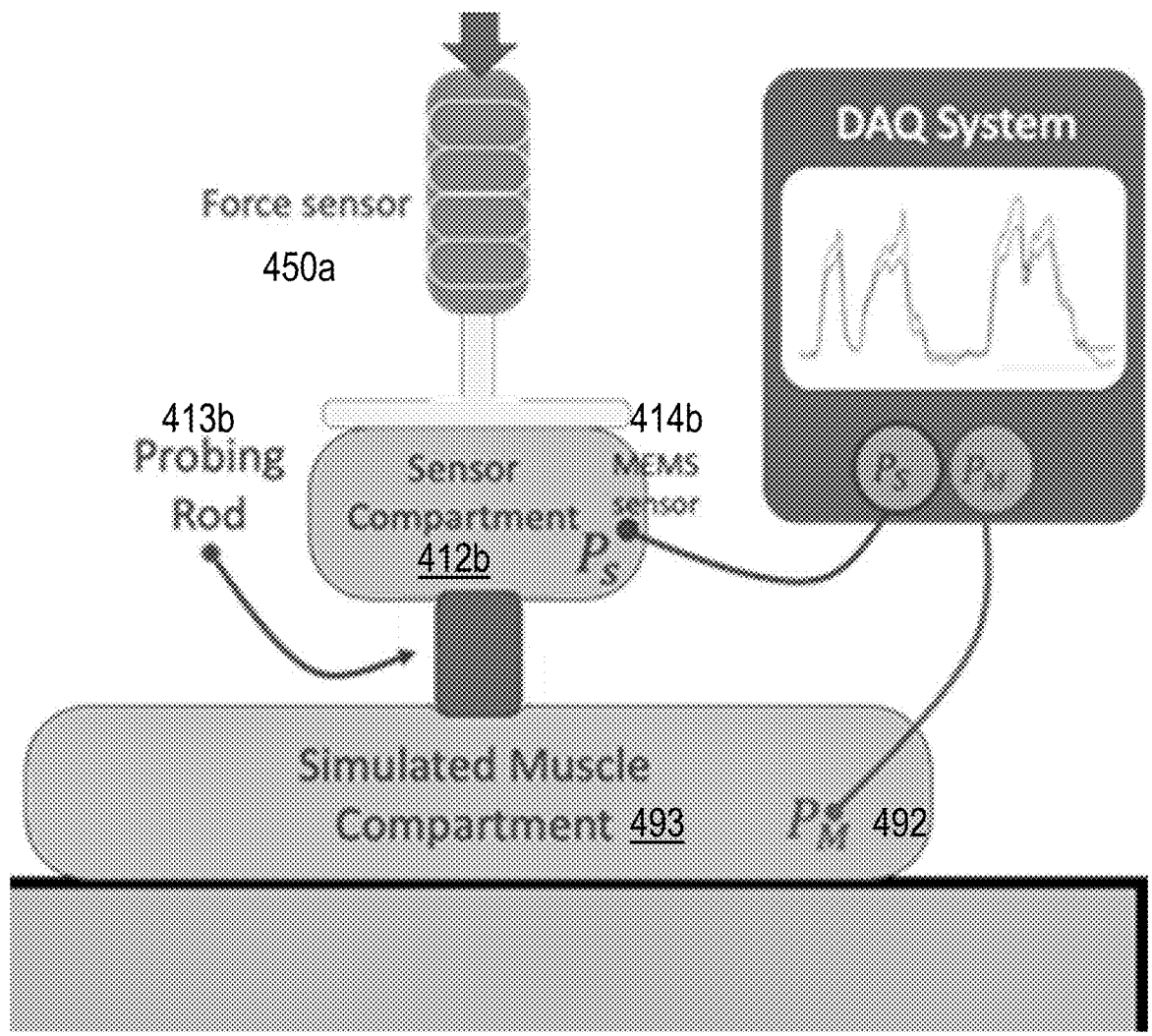
Figure 4D:
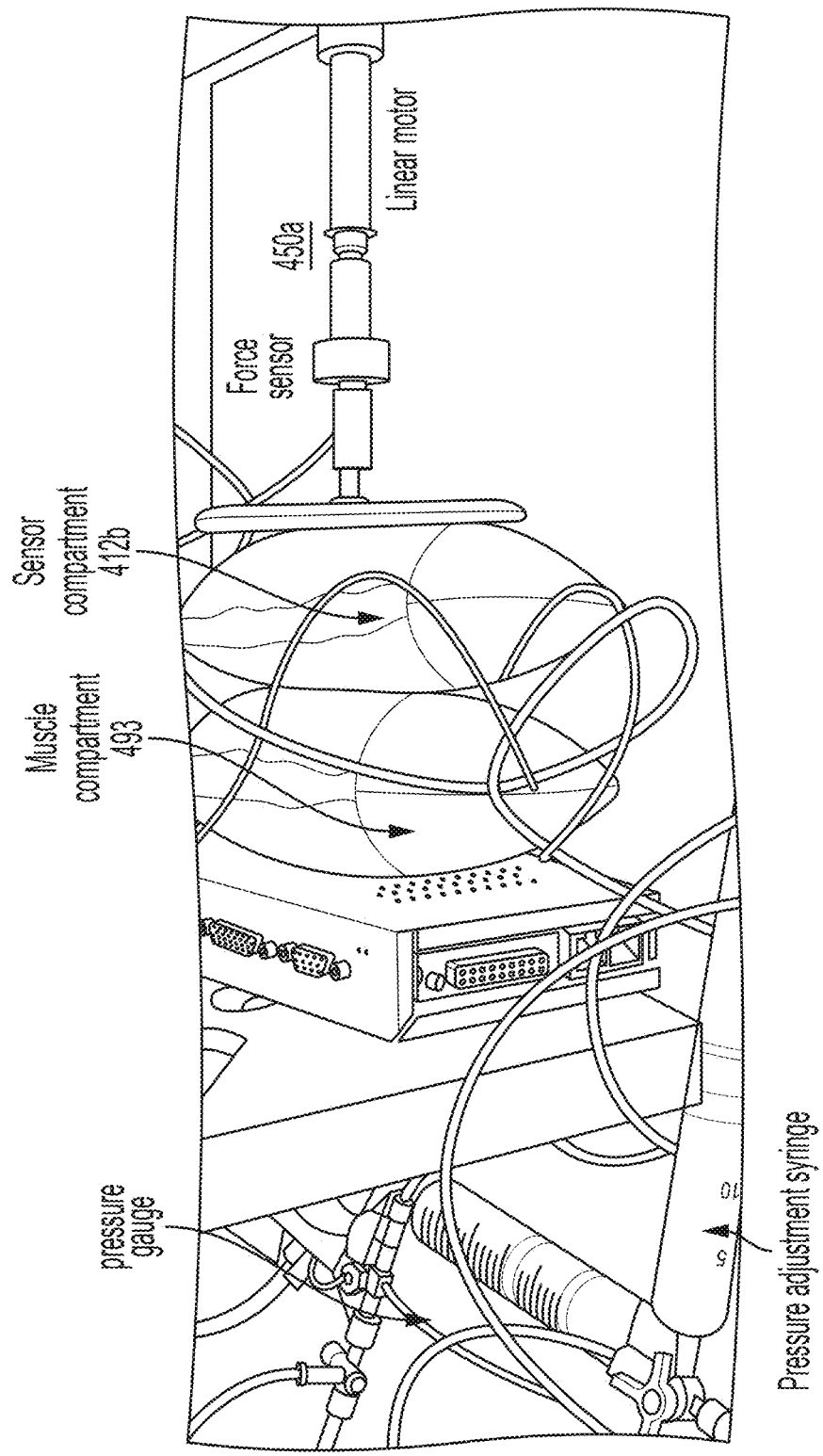

FIG. 4C shows a schematic diagram of a calibration setup for the proposed pressure sensor assembly, according to an embodiment. A probing rod 413b is positioned between the pressure sensor compartment 412b and muscle compartment 493. The pressure sensor compartment and muscle compartment are each represented by a bag filled with saline solution. With the compressive force from above, which can be optionally measured by a force sensor 450a in the handle, the probing rod is slightly pushed into both direction and deformed at each end so as to reach equal pressure at both ends. For comparison, the pressure of the muscle compartment measured by calibration pressure sensor 492 and the pressure sensor compartment measured by MEMS pressure sensor 414b are measured directly using pressure sensors connected to the saline bags. The initial pressure of the saline bag of the 'pressure sensor compartment' was set to be slightly below the pressure of the saline bag of the 'muscle compartment' (30 mmHg or 40 mmHg). A photograph of the experimental setup is presented as FIG. 4D.

Figure 4E:
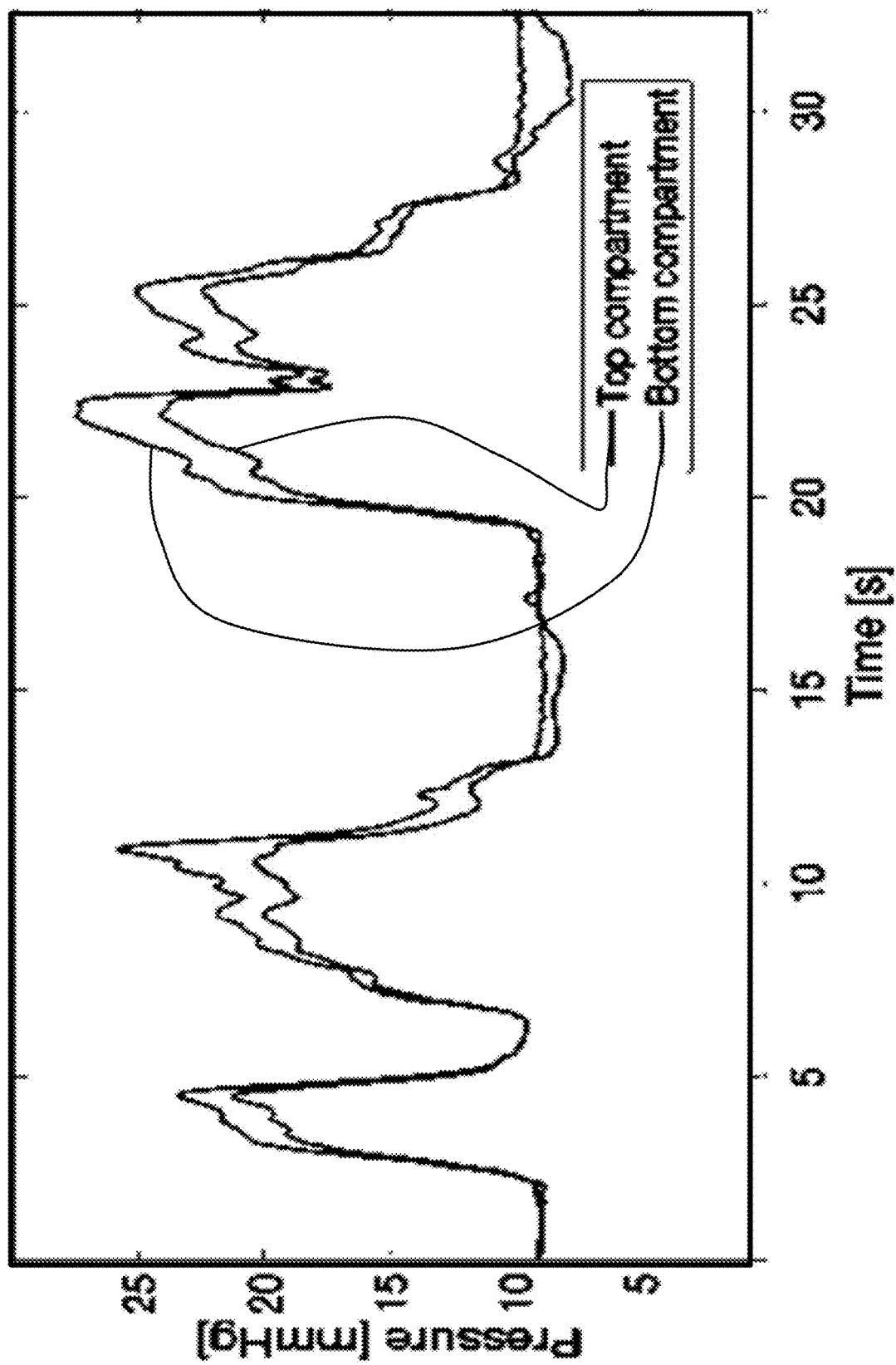

FIG. 4E is a graph that illustrates example results as the force is applied (loaded) and released (unloaded) to different degrees four times. The result shows that the measured pressure of the saline bag 412b (top compartment) simulating the pressure sensor compartment 412a matched with that of the saline bag (493) simulating muscle compartment 110. The minor discrepancy between the two curves was due to the weight of the top saline bag because the bags were stacked vertically in a gravitational field. The loading was not applied uniformly in time and did not reach the simulated muscle compartment pressure of 40 mmHg. Thus the change in slope anticipated at the full simulated muscle compartment pressure was not detected. This experiment was designed just to demonstrate that the pressure in the fluid chamber 212 is expected to match the pressure applied to the underlying muscle compartment 110, at least up to the lower compartment pressure.

Figure 5A:
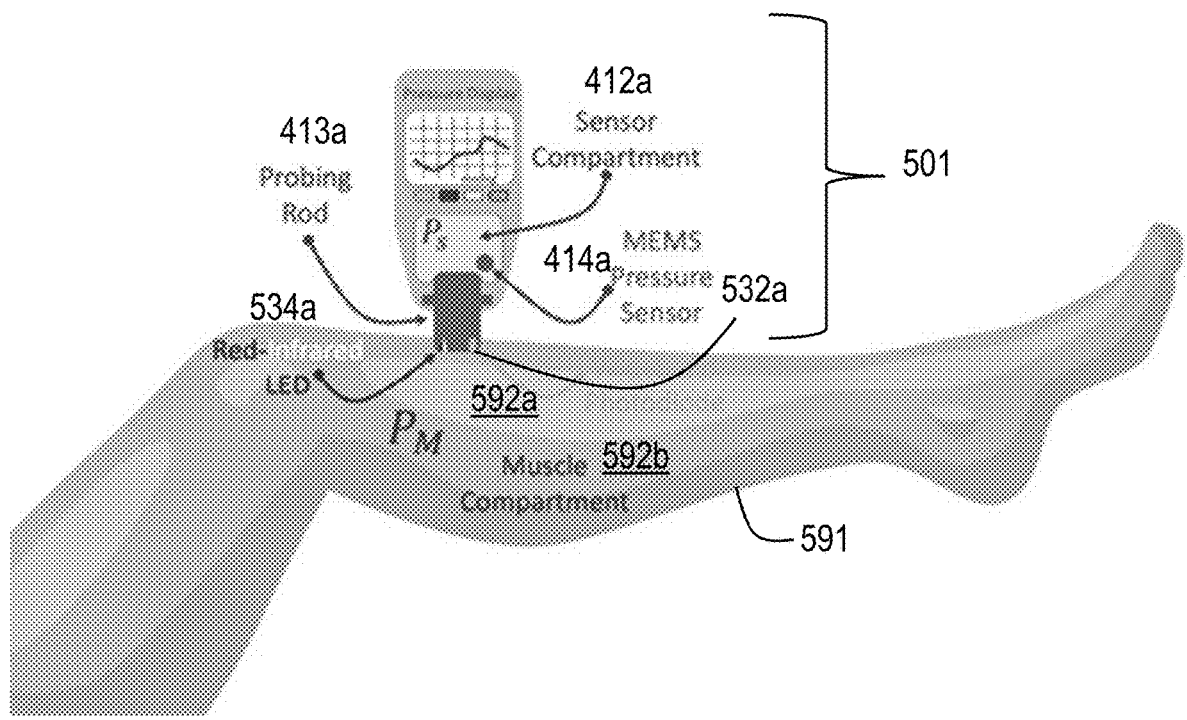
FIG. 5A through FIG. 5D are block diagrams that illustrate use and calibration of a optical sensor for oxygen saturation measurements in a hand held apparatus configured to non-invasively detect compartment syndrome, according to an embodiment.

FIG. 5A through FIG. 5D are block diagrams that illustrate use and calibration of an optical sensor for oxygen saturation measurements in a hand held apparatus configured to non-invasively detect compartment syndrome, according to an embodiment. Because compartment pressure measurement alone may not be reliable in detecting muscle ischemia and compartment syndrome, and intramuscular partial pressure of oxygen was effective in identifying muscle ischemia with high sensitivity and, and considering blood oxygen saturation is closely related to the intramuscular partial pressure of oxygen, the blood oxygen saturation (SpO2) is also measured noninvasively. As depicted in FIG. 5A, components of the blood oxygen saturation sensor 230 can be mounted on the side of the compartment pressure assembly comprising probing rod 413a, sensor fluid compartment 412a and MEMS pressure sensor 414a as depicted above in FIG. 4A for convenient combined measurements by device 501. The components of the optical $SpO_2$ sensor 230 include one or more LEDs in optical source array 534a and two or more photodiodes in optical detector array 532a. The components 532a and 534a are configured to detect saturation levels in subject 591, not just in superficial compartment 592a but also in deep compartment 592b.

Figure 5B:
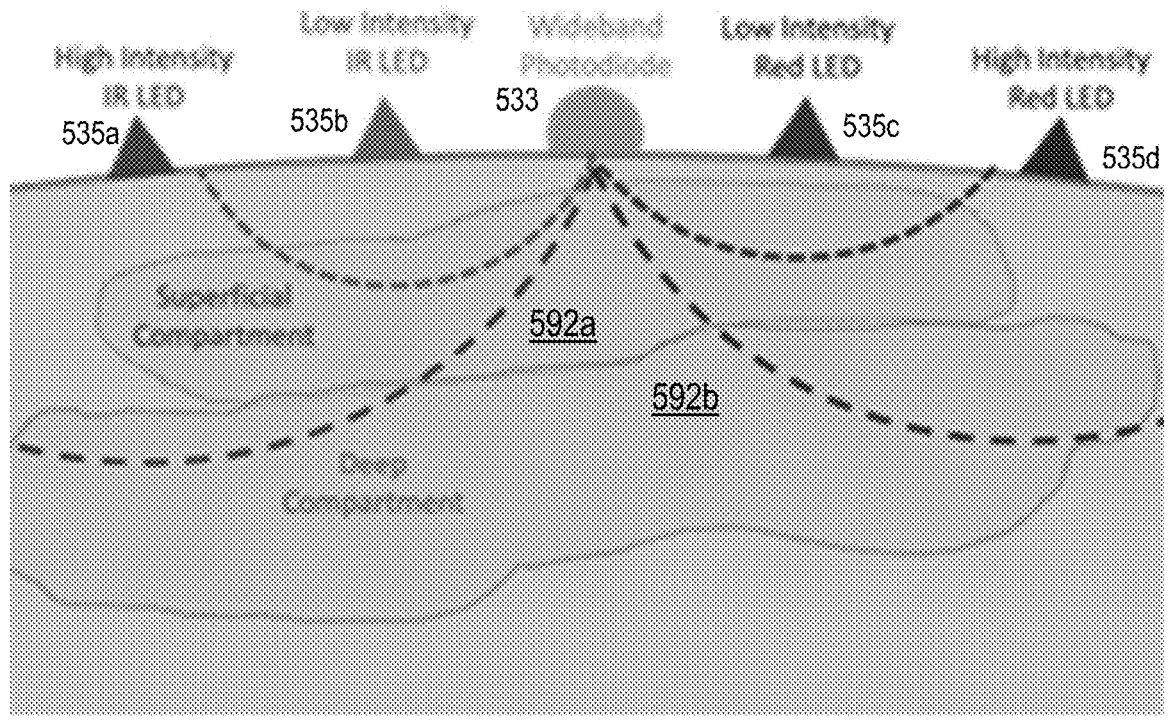

FIG. 5B shows that rays reaching an optical detector 533 from LEDs 535a, 535b, 535c and 535d travel in shallow paths (short dashed rays) that traverse superficial compartment 592a but do not traverse deep compartment 592b. Thus, the optical detector array 532 in device 501 includes some LEDS, (not shown) with greater spatial separations from detectors in array 532a so that at least some rays follow deeper paths (long dash rays) that traverse the deep compartment 592.

In some embodiments, a reflective pulse oximetry device to measure the $SpO_2$ in larger limbs includes a TI AFE4900 development kit, in which red and infrared light are projected through the skin, reflected off the hemoglobin present in the arteries beneath the skin, and measured by photodiodes present in the device. Implementing a separation of about 2 cm between the LED and the photodiode in the pilot study allowed for greater light penetration which in turn yields data with relatively high signal to noise ratio (SNR) in the human leg. The data collected with the separation method at the lower leg was then processed with conventional photoplethysmography (PPG) algorithm to obtain SpO2 values, which was comparable to measurements collected simultaneously with a commercial PPG fingertip clamp unit, in human subjects, The lack of deep paths is more pronounced for the more absorbed wavelength in the red part of the visible spectrum used in some conventional optical $SpO_2$ sensors. Thus, multiple frequencies in the infrared region are used in various embodiments. In these embodiments, the SpO2 optical source array 534 is more similar to the fNIRS measurements, which measures brain tissue oxygenation using near-infrared light with light-emitting LEDs and the detecting photodiodes are placed far away (several centimeters) from each other. In various embodiments, illuminating LEDs of array 534 and the photodiodes of array 532 are placed on the leg about 2 to 8 cm apart, which enables measurements at deeper tissues in the larger limb segments (e.g., leg). Again, control parameters used by CS module 282 are adjusted during calibration experiments in step 301 to obtain stronger signal and higher signal to noise ratios.

In some embodiments, device 501 is configured to measure oxygen in larger limbs, using an array configuration of PDs 532 and multi-wavelengths (WL) LEDs 534 to reach muscles in larger limbs and detect oxygen deficiency in muscle compartment. It has been shown that IR LEDs can penetrate deep into the larger limbs. Different from existing $SpO_2$ oximeters that use red and IR LEDs, this device uses the novel combination of two IR WL LEDs, e.g. at wavelengths of 770 and 940 nm. In addition, an array of PDs is used to measure oxygen levels in deep and shallow soft tissues at distances from 1 to 8 cm from the LED array 534. This arrangement is called a Strip sensor. $SpO_2$ calculation are based on Beer-Lambert Law according to Equation 4.:

$$SpO_2 = a - bR \qquad (4)$$

with $R=(AC_{770}/DC_{770})/(AC_{940}/DC_{940})$ where AC being the pulsatile absorbance and DC being the non-pulsatile absorbance. Parameters a and b are determined through calibration.

Figure 5C:
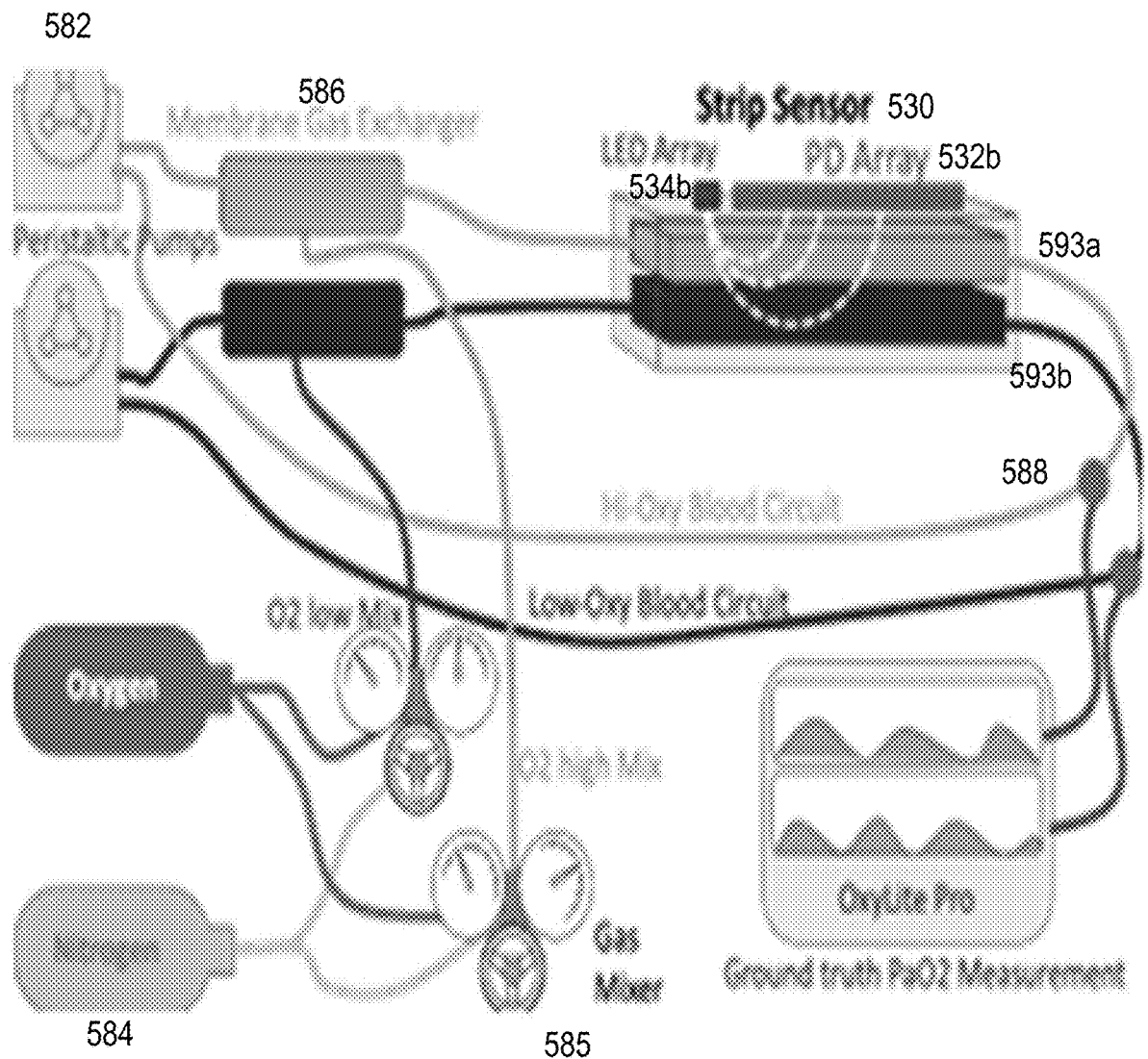
Figure 5D:
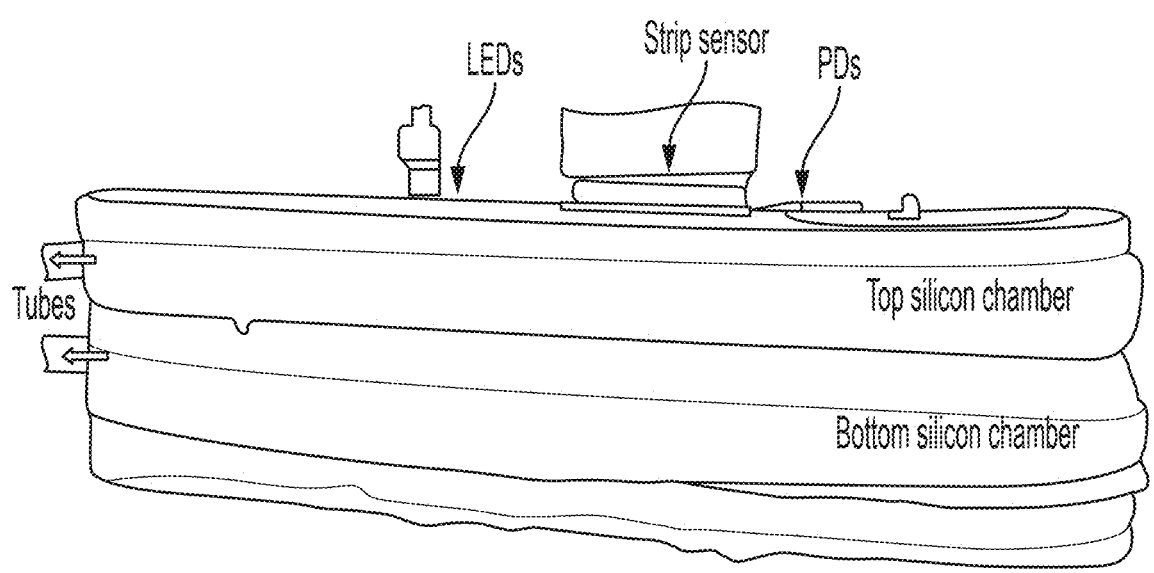
Figure 6A:
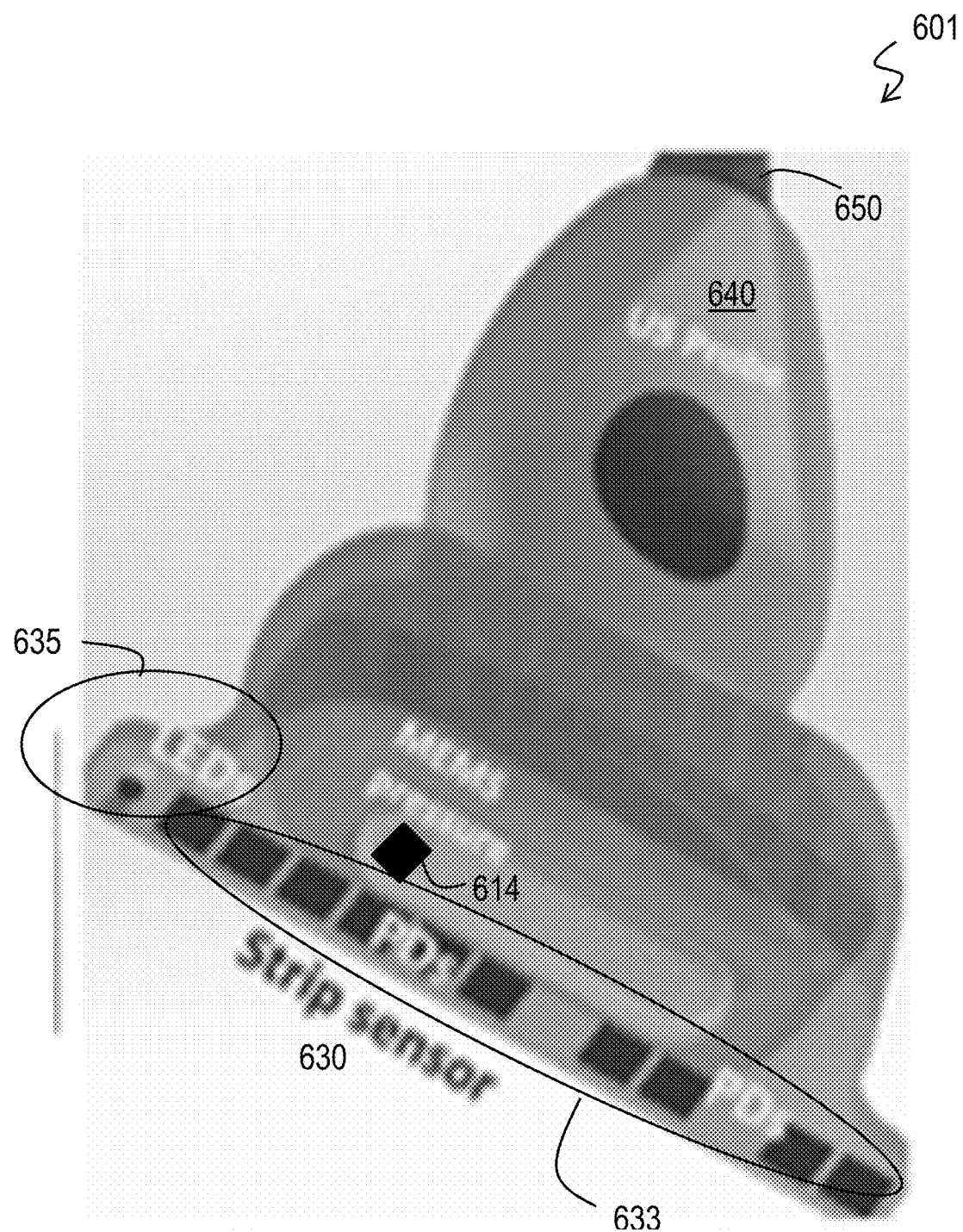
FIG. 6A and FIG. 6B are block diagrams that illustrate arrangement and use of multiple sensors in a hand-held apparatus configured to non-invasively detect compartment syndrome, according to an embodiment.
Figure 6B:
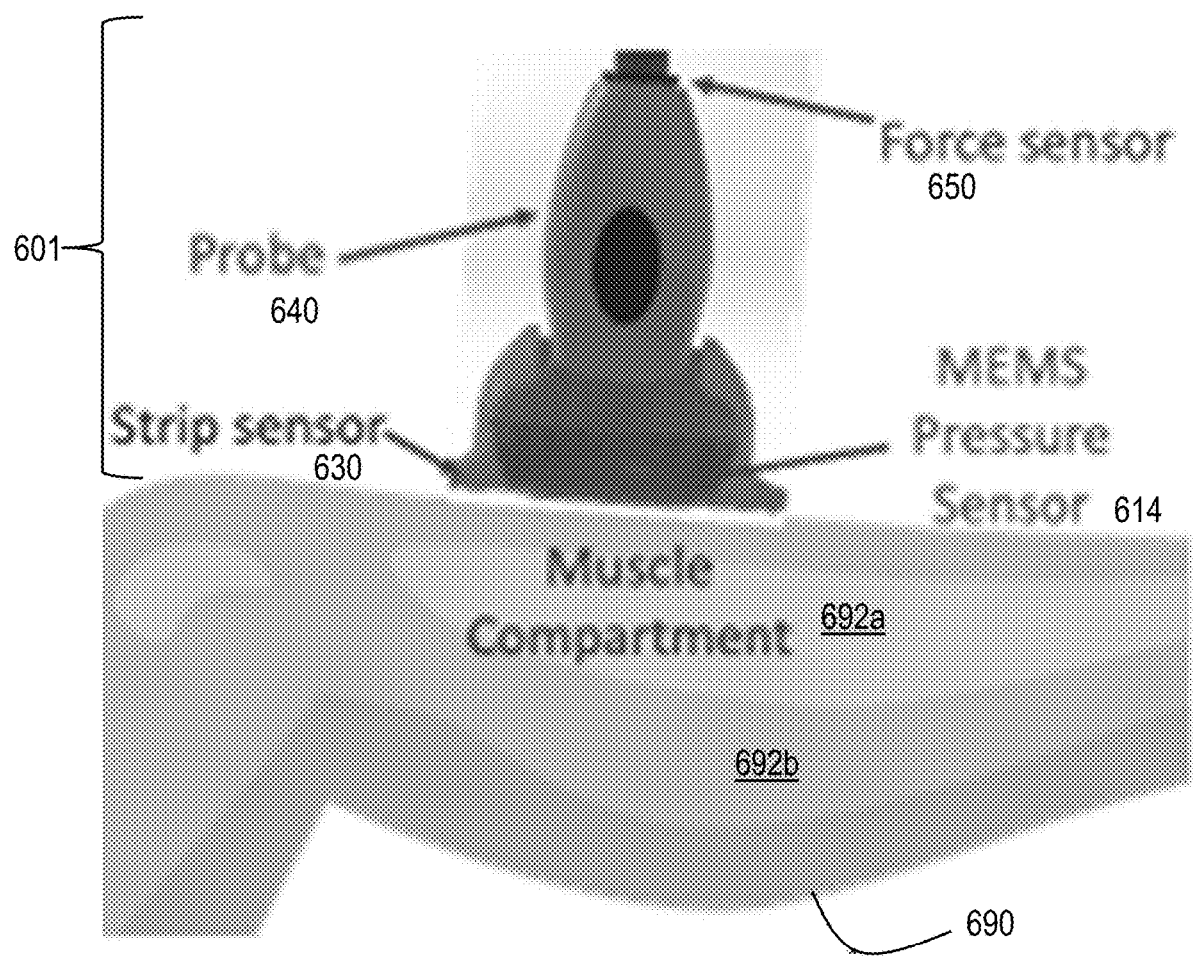

Calibrations and validations for the optical $SpO_2$ sensor are done on phantoms with oxygenated and deoxygenated blood flow through stacked chambers, as shown in FIG. 5C. A photograph of the experimental setup is presented as FIG. 5D. A Strip sensor 530 was built with an optical source array 532b having IR LEDs reaching >5 cm depth and PD array 532b detecting deep-tissue reflected IR signals. Strip sensor on healthy human leg and Masimo finger oximeters simultaneously gave matching $SpO_2$. Note that $SpO_2$ at different body sites are regarded as the same in healthy subjects. An O2 phantom with adjustable 70-100% O2 in each of two chambers 593a and 5932 simulating superficial and deep muscle compartments, respectively. Each chamber was part of a separate closed circuit of blood, forced to circulate by virtue of separate peristaltic pumps 582. Oxygen from separate supply tanks 584 were regulated by gas mixers 585 to flow into respective membrane gas exchangers 586. The O2 levels in each circuit were measured by separate oxygen ground truth sensors 588. The result was that the Strip sensor 530 output matches directly measured blood O2 in the phantom by ground truth sensors 588. Software controlling multiple LEDs and PDs and for detecting S FIG. 6A and FIG. 6B are block diagrams that illustrate arrangement and use of multiple sensors in a hand-held apparatus 601 configured to non-invasively detect compartment syndrome, according to an embodiment. In this embodiment device 601 includes a force sensor 650, an ultrasound probe 540, a Strip sensor 630 with LEDs 635 and PDs 633 at separation up to 8 cm, and MEMS pressure sensor 614. FIG. 6B shows the device 601 as deployed in contact with subject 690 having a superficial muscle compartment 692a and a deep muscle compartment 692b.

Figure 7:
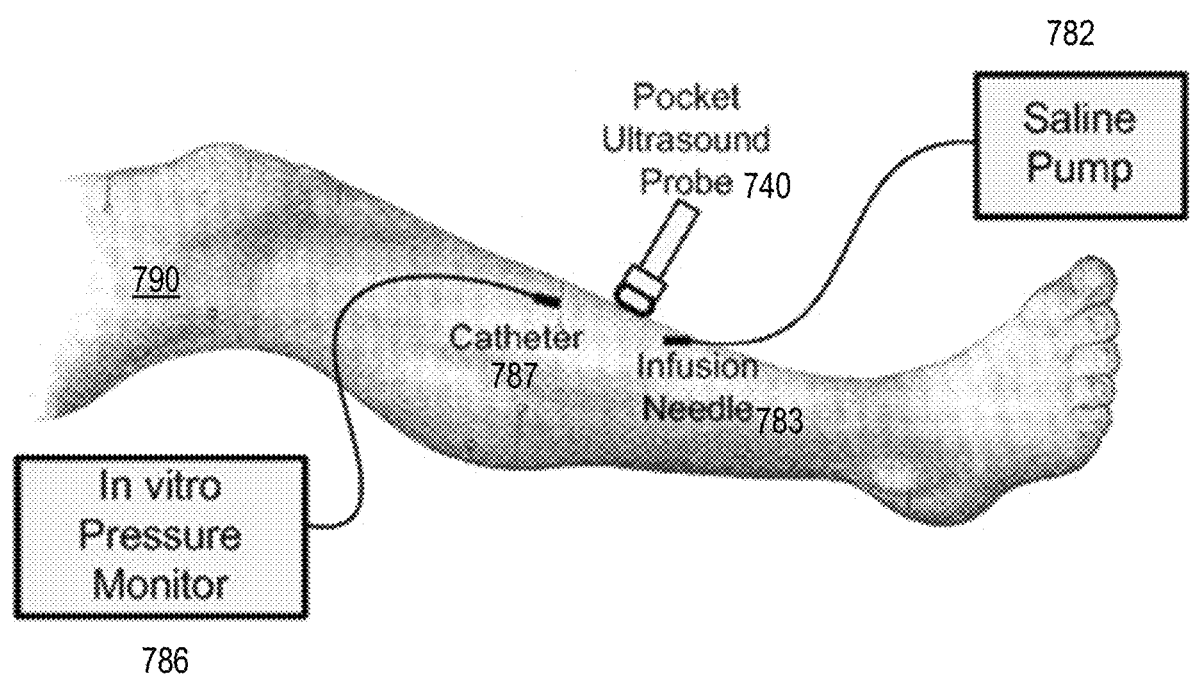
FIG. 7 is a block diagram that illustrates use and calibration of an ultrasound (US) sensor in a hand-held apparatus configured to non-invasively detect compartment syndrome, according to an embodiment.

FIG. 7 is a block diagram that illustrates use and calibration of an ultrasound (US) probe 740 in a hand-held apparatus configured to non-invasively detect compartment syndrome, according to an embodiment. A human cadaver or lamb leg model of compartment pressure is used for validation and calibration of US probes, with or without accompanying pressure, in detecting CS. Fresh-frozen lower limbs are used as the subject 790 for the testing and calibration. Saline solution is injected by saline pump 782 through an infusion needle 783 into a target compartment (e.g., anterior compartment of the leg) to increase the compartment pressure while the intra-compartment pressure is measured for ground truth by a blood pressure transducer in catheter 787 reporting to in vitro pressure monitor 786. At each of the several controlled levels of compartment pressure, the compartment stiffness is measured by the hand-held US probe 740. In some embodiments, pressure is also measured by the proposed handheld compartment pressure sensor (not shown). Thus, the increased stiffness/elasticity in CS will be measured through ultrasound elastography noninvasively using standard diagnostic procedures.

3. Computational Hardware

Figure 8:
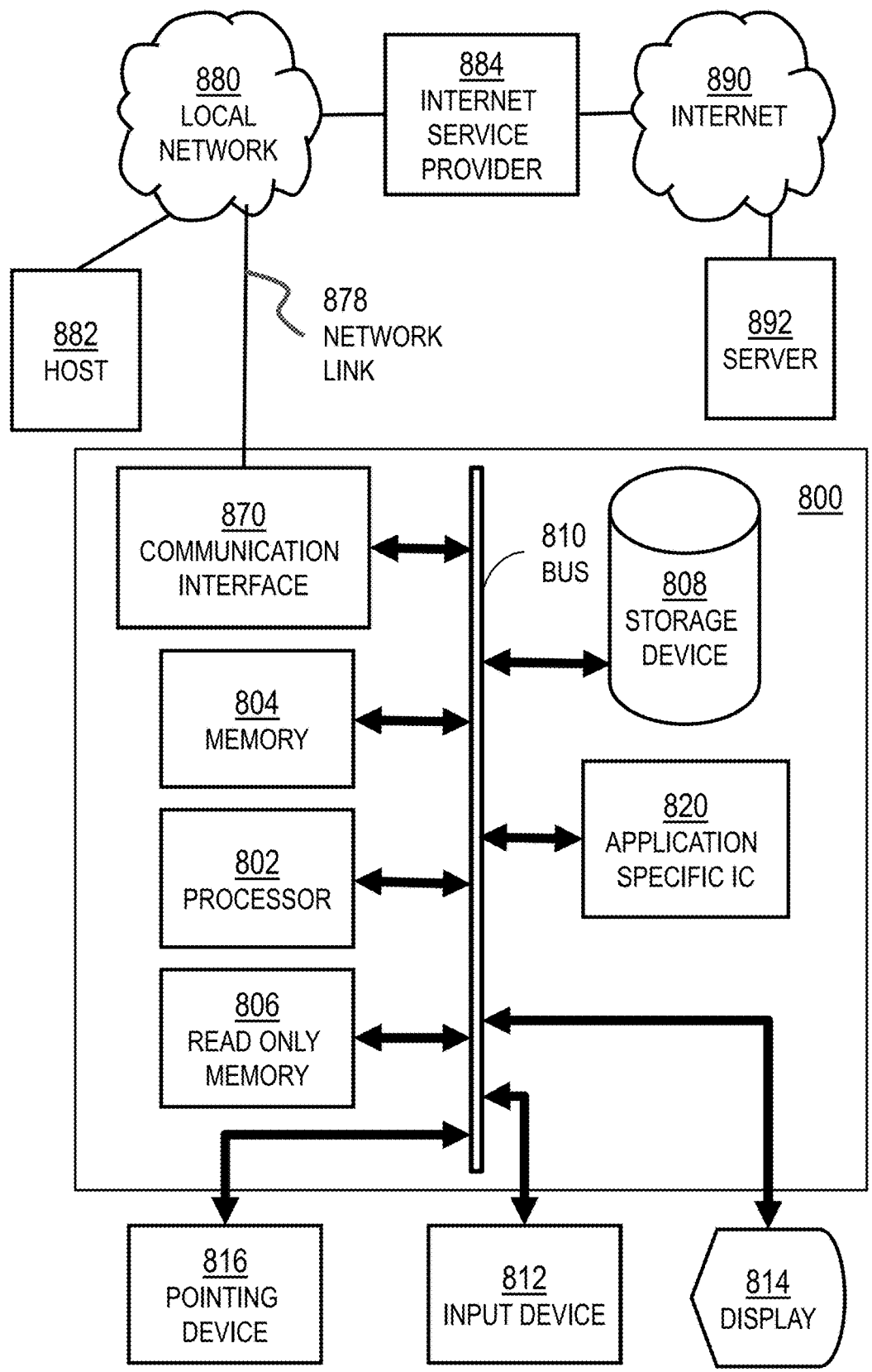
FIG. 8 is a block diagram that illustrates a computer system upon which some steps of an embodiment may be implemented.

FIG. 8 is a block diagram that illustrates a computer system 800 upon which an embodiment of the invention may be implemented. Computer system 800 includes a communication mechanism such as a bus 810 for passing information between other internal and external components of the computer system 800. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of one or more methods described herein.

A sequence of binary digits constitutes digital data that is used to represent a number or code for a character. A bus 810 includes many parallel conductors of information so that information is transferred quickly among devices coupled to the bus 810. One or more processors 802 for processing information are coupled with the bus 810. A processor 802 performs a set of operations on information. The set of operations include bringing information in from the bus 810 and placing information on the bus 810. The set of operations also typically include comparing two or more units of information, shifting positions of units of information, and combining two or more units of information, such as by addition or multiplication. A sequence of operations to be executed by the processor 802 constitutes computer instructions.

Computer system 800 also includes a memory 804 coupled to bus 810. The memory 804, such as a random access memory (RAM) or other dynamic storage device, stores information including computer instructions. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of computer instructions. The computer system 800 also includes a read only memory (ROM) 806 or other static storage device coupled to the bus 810 for storing static information, including instructions, that is not changed by the computer system 800. Also coupled to bus 810 is a non-volatile (persistent) storage device 808, such as a magnetic disk or optical disk, for storing information, including instructions, that persists even when the computer system 800 is turned off or otherwise loses power.

Information, including instructions, is provided to the bus 810 for use by the processor from an external input device 812, such as a keyboard containing alphanumeric keys operated by a human user, or a sensor. A sensor detects conditions in its vicinity and transforms those detections into signals compatible with the signals used to represent information in computer system 800. Other external devices coupled to bus 810, used primarily for interacting with humans, include a display device 814, such as a cathode ray tube (CRT) or a liquid crystal display (LCD), for presenting images, and a pointing device 816, such as a mouse or a trackball or cursor direction keys, for controlling a position of a small cursor image presented on the display 814 and issuing commands associated with graphical elements presented on the display 814.

In the illustrated embodiment, special purpose hardware, such as an application specific integrated circuit (IC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 870 sends and receives electrical, acoustic or electromagnetic signals, including infrared and optical signals, that carry information streams, such as digital data.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 802, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 802, except for carrier waves and other signals.

Logic encoded in one or more tangible media includes one or both of processor instructions on a computer-readable storage media and special purpose hardware, such as ASIC 820.

Network link 878 typically provides information communication through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890. A computer called a server 892 connected to the Internet provides a service in response to information received over the Internet. For example, server 892 provides information representing video data for presentation at display 814.

The invention is related to the use of computer system 800 for implementing the techniques described herein. According to one embodiment of the invention, those techniques are performed by computer system 800 in response to processor 802 executing one or more sequences of one or more instructions contained in memory 804. Such instructions, also called software and program code, may be read into memory 804 from another computer-readable medium such as storage device 808. Execution of the sequences of instructions contained in memory 804 causes processor 802 to perform the method steps described herein. In alternative embodiments, hardware, such as application specific integrated circuit 820, may be used in place of or in combination with software to implement the invention. Thus, embodiments of the invention are not limited to any specific combination of hardware and software.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server 892 transmits program code for a particular application, requested by a message sent from computer 800, through Internet 890, ISP equipment 884, local network 880 and communications interface 870. The received code may be executed by processor 802 as it is received, or may be stored in storage device 808 or other non-volatile storage for later execution, or both. In this manner, computer system 800 may obtain application program code in the form of a signal on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red a carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

Figure 9:
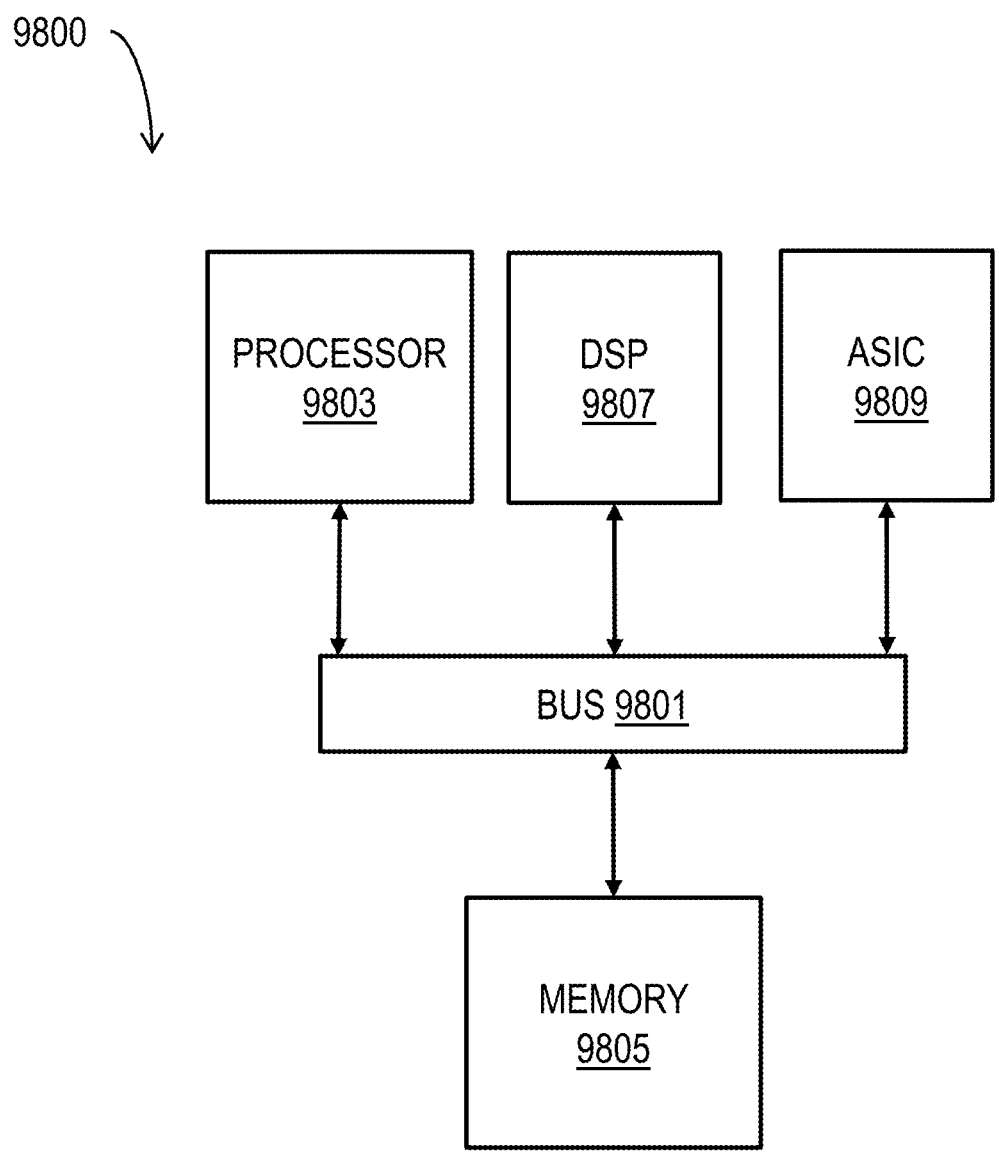
FIG. 9 illustrates a chip set 900 upon which an embodiment of the invention may be implemented.

FIG. 9 illustrates a chip set 900 upon which an embodiment of the invention may be implemented. Chip set 900 is programmed to perform one or more steps of a method described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of a method described herein.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA)

(not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 905 also stores the data associated with or generated by the execution of one or more steps of the methods described herein.

Figure 10:
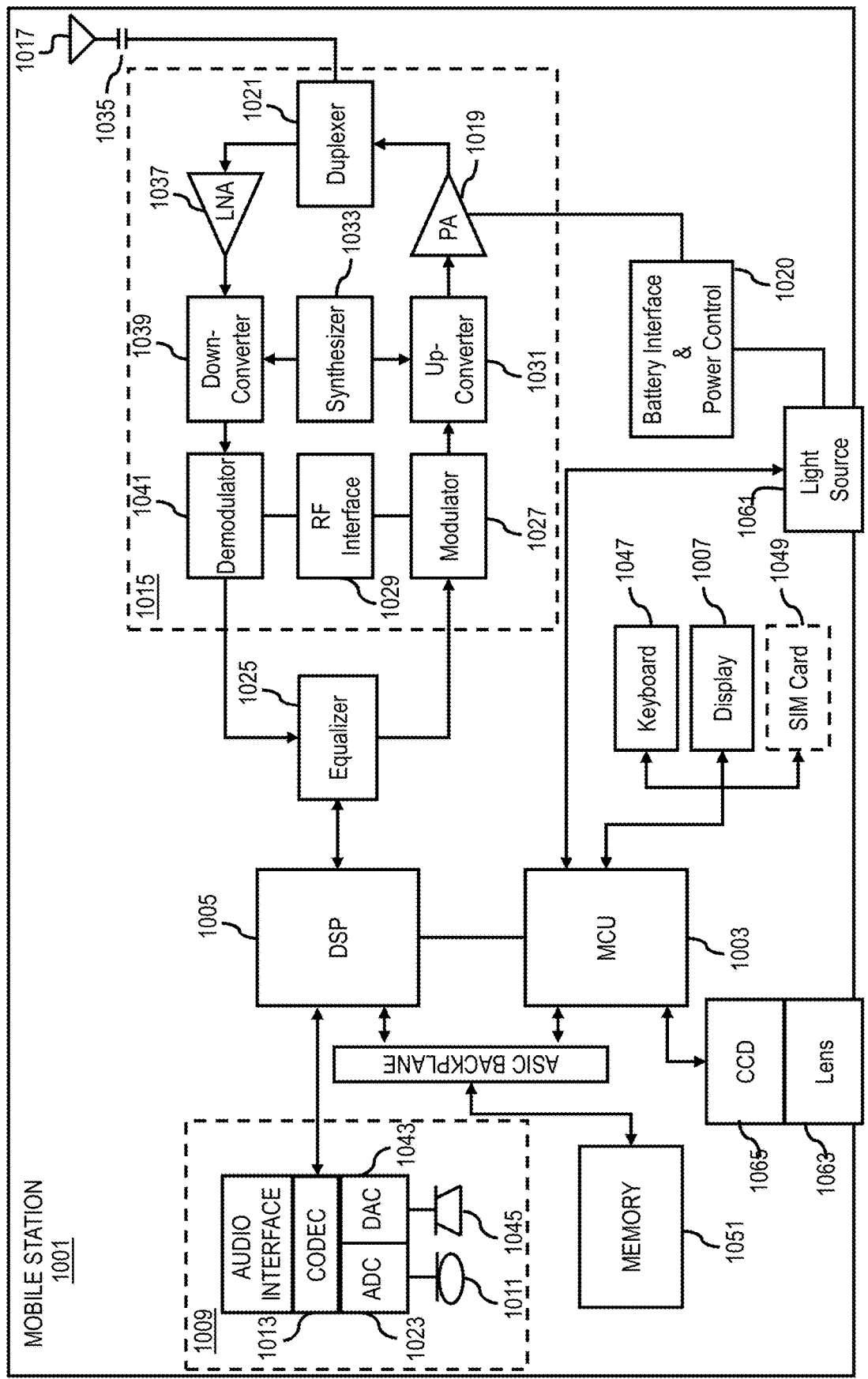
FIG. 10 is a diagram of exemplary components of a mobile terminal 1000 (e.g., cell phone handset) for communications, which is capable of operating in the system of FIG. 2A, according to one embodiment.

FIG. 10 is a diagram of exemplary components of a mobile terminal 1000 (e.g., cell phone handset) for communications, which is capable of operating in the system of FIG. 2A, according to one embodiment. In some embodiments, mobile terminal 1001, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps as described herein. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 as described herein. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending on the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

In some embodiments, the mobile terminal 1001 includes a digital camera comprising an array of optical detectors, such as charge coupled device (CCD) array 1065. The output of the array is image data that is transferred to the MCU for further processing or storage in the memory 1051 or both. In the illustrated embodiment, the light impinges on the optical array through a lens 1063, such as a pin-hole lens or a material lens made of an optical grade glass or plastic material. In the illustrated embodiment, the mobile terminal 1001 includes a light source 1061, such as a LED to illuminate a subject for capture by the optical array, e.g., CCD 1065. The light source is powered by the battery interface and power control module 1020 and controlled by the MCU 1003 based on instructions stored or loaded into the MCU 1003.

4. Alternatives, Deviations and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

5. References

Each of the following references is hereby incorporated by reference as if fully set forth herein except for terminology inconsistent with that used herein.

Abay, T. Y., and Kyriacou, P. A., 2015. Reflectance Photoplethysmography as Noninvasive Monitoring of Tissue Blood Perfusion. *IEEE Transactions on Biomedical Engineering*. 62, 2187-95.

Lee, S. S. M., Gaebler-Spira, D., Zhang, L.-Q., Rymer, W. Z., and Steele, K. M., 2016. Use of shear wave ultrasound elastography to quantify muscle properties in cerebral palsy. *Clinical Biomechanics*. 31, 20-28.

What is claimed is:

1. An apparatus for non-invasive detection of compartment syndrome (CS) in a subject, said apparatus comprising:
a structural body configured to be held in a human hand, wherein the body includes a subject contact element that is not in contact with the human hand and is configured to contact but not penetrate a skin layer of a subject;
an optical sensor configured to detect oxygen saturation at a plurality of depths of a subject in contact with the subject contact element, said optical sensor comprising a light emitting diode (LED) and a plurality of photo detectors at corresponding different distances from the LED;
a pressure sensor configured to determine the pressure on the subject contact, wherein the pressure sensor includes a fluid chamber and a micro-electrical-mechanical system (MEMS) pressure sensor in fluid contact with fluid in the chamber; and
a processor configured to use data from at least one of the optical sensor and the pressure sensor to detect compartment syndrome.

2. The apparatus as recited in claim 1, further comprising an ultrasound probe configured to determine stiffness of a compartment of the subject.

3. The apparatus as recited in claim 2, further comprising a means for determining whether the subject in contact with the subject contact element has compartment syndrome based at least in part on data from the ultrasound probe.

4. The apparatus as recited in claim 1, further comprising a means for determining whether the subject in contact with the subject contact element has compartment syndrome based at least in part on the data from the optical sensor.

5. The apparatus as recited in claim 4, further comprising a means for displaying that the subject has compartment syndrome.

6. The apparatus as recited in claim 5, wherein the means for displaying that the subject has compartment syndrome includes an on-board display device or a communication link with a remote device comprising a display device, or some combination.

7. The apparatus as recited in claim 4, wherein the means for determining whether the subject in contact with the subject contact element has compartment syndrome includes an on-board processor configured to make the determination or a communication link with a remote processor configured to make the determination, or some combination.

8. The apparatus as recited in claim 1, wherein the LED is configured to output a plurality of optical frequencies.

9. The apparatus as recited in claim 1, wherein the LED is configured to output a plurality of infrared optical frequencies.

10. The apparatus as recited in claim 1, wherein the LED is configured to output a plurality of different optical intensities.

11. The apparatus as recited in claim 1, further comprising a means for determining whether the subject in contact with the subject contact element has compartment syndrome based at least in part on the data from the pressure sensor.

12. The apparatus as recited in claim 1, further comprising a displacement sensor configured to determine displacement into a fluid filled flexible chamber by a probing rod or by a plunger or by both.

13. An apparatus for non-invasive detection of compartment syndrome (CS) in a subject, said apparatus comprising:
a structural body configured to be held in a human hand, wherein the body includes a subject contact element that is not in contact with the human hand and is configured to contact but not penetrate a skin layer of a subject;
an optical sensor configured to detect oxygen saturation at a plurality of depths of a subject in contact with the subject contact element, said optical sensor comprising a light emitting diode (LED) and a plurality of photo detectors at corresponding different distances from the LED;
a pressure sensor configured to determine the pressure on the subject contact;
a displacement sensor configured to determine displacement into a fluid filled flexible chamber by a probing rod or by a plunger or by both; and
a processor configured to use data from at least one of the optical sensor, the pressure sensor and the displacement sensor to detect compartment syndrome.

14. The apparatus as recited in claim 13, further comprising an ultrasound probe configured to determine stiffness of a compartment of the subject.

15. The apparatus as recited in claim 14, further comprising a means for determining whether the subject in contact with the subject contact element has compartment syndrome based at least in part on data from the ultrasound probe.

16. The apparatus as recited in claim 13, further comprising a means for determining whether the subject in contact with the subject contact element has compartment syndrome based at least in part on the data from the optical sensor.

17. The apparatus as recited in claim 13, further comprising a means for displaying that the subject has compartment syndrome.

18. The apparatus as recited in claim 13, further comprising a means for determining whether the subject in contact with the subject contact element has compartment syndrome based at least in part on the data from the pressure sensor.

* * * * *